US012596681B1

(12) United States Patent
Iragavarapu et al.

(10) Patent No.: US 12,596,681 B1
(45) Date of Patent: Apr. 7, 2026

(54) SYSTEMS AND METHODS FOR IMPROVED FILE PROCESSING

(71) Applicant: AARETE, Chicago, IL (US)

(72) Inventors: Priya Iragavarapu, Naperville, IL (US); Darren Ghanayem, St. Petersburg, FL (US); Erica Nelson, Mill Valley, CA (US); Maria Lynn Turner, Palatine, IL (US)

(73) Assignee: AARETE, Chicago, IL (US)

( * ) Notice: Subject to any disclaimer, the term of this patent is extended or adjusted under 35 U.S.C. 154(b) by 0 days.

(21) Appl. No.: 19/247,353

(22) Filed: Jun. 24, 2025

(51) Int. Cl.
| | |
|---|---|
| *G06F 17/00* | (2019.01) |
| *G06F 7/00* | (2006.01) |
| *G06F 16/16* | (2019.01) |
| *G06F 16/174* | (2019.01) |
| *G06F 16/185* | (2019.01) |

(52) U.S. Cl.
CPC .......... *G06F 16/16* (2019.01); *G06F 16/1748* (2019.01); *G06F 16/185* (2019.01)

(58) Field of Classification Search
CPC ..... G06F 16/16; G06F 16/1748; G06F 16/185
USPC ........................................................ 707/602
See application file for complete search history.

(56) References Cited

U.S. PATENT DOCUMENTS

| | | | |
|---|---|---|---|
| 8,880,525 | B2 | 11/2014 | Galle et al. |
| 9,002,842 | B2 | 4/2015 | Ravid |
| 9,760,622 | B2 | 9/2017 | Ravid |
| 10,832,164 | B2 | 11/2020 | Chernis et al. |

| | | | | |
|---|---|---|---|---|
| 11,170,055 | B2 | 11/2021 | Hutchins | |
| 11,580,763 | B2 | 2/2023 | Ammar et al. | |
| 11,907,677 | B1 | 2/2024 | Borhany | |
| 11,934,789 | B2 | 3/2024 | Hutchins | |
| 2004/0073531 | A1* | 4/2004 | Patterson | .............. G06F 16/958 |
| 2009/0070366 | A1* | 3/2009 | Zhao | ................... G06F 16/9558 |
| | | | | 707/999.102 |
| 2010/0293117 | A1 | 11/2010 | Xu | |
| 2013/0282663 | A1* | 10/2013 | Wade | ...................... G06F 16/10 |
| | | | | 707/823 |

(Continued)

OTHER PUBLICATIONS

Turquoise Health webpage, 7 pages, downloaded Sep. 16, 2025, available at <https://turquoise.health/products/clear_contracts>.

*Primary Examiner* — Pavan Mamillapalli
(74) *Attorney, Agent, or Firm* — MARSHALL, GERSTEIN & BORUN LLP

(57) ABSTRACT

Systems and methods for improved file processing are provided herein. An example system includes instructions stored on one or more memories that may cause the system to extract textual data and metadata from a file, and the metadata may have a hierarchical format to preserve hierarchical data structures of the file. The instructions may further cause the system to convert the textual data into an embedding and decompose the textual data into a set of chunks via a semantic search and a keyword search. The instructions may further cause the system to cluster the file into a cluster based on structural and semantic clustering, generate an output based on the cluster, and cause the output to be displayed. These systems and methods reduce the inefficiencies/inaccuracies stemming from existing procedures, among other advantages, by preserving extracted data relationships, improving navigability through interconnected information, and enabling more efficient data decomposition and manipulation.

20 Claims, 15 Drawing Sheets

(56)          References Cited

U.S. PATENT DOCUMENTS

2021/0011826 A1 *  1/2021  Lindquist ............ G06F 11/1435
2023/0334093 A1 * 10/2023  Garduno Hernandez ...................
                                                    G06F 16/9024
2024/0330927 A1    10/2024  Abdelrahman et al.

\* cited by examiner

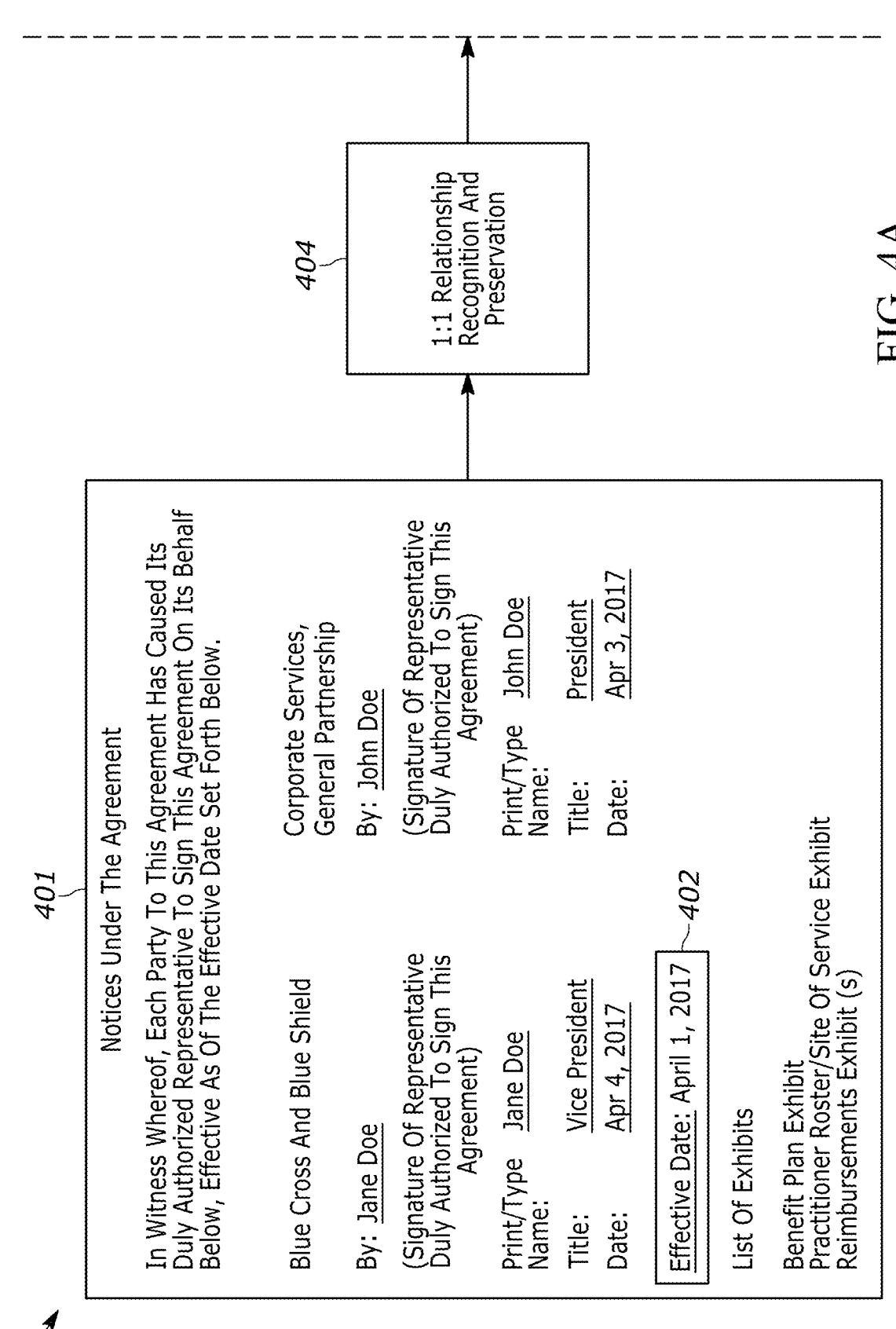

400

401

Notices Under The Agreement

In Witness Whereof, Each Party To This Agreement Has Caused Its
Duly Authorized Representative To Sign This Agreement On Its Behalf
Below, Effective As Of The Effective Date Set Forth Below.

Blue Cross And Blue Shield

By: Jane Doe (Signature Of Representative
Duly Authorized To Sign This
Agreement)

Print/Type    Jane Doe
Name:

Title:      Vice President

Date:      Apr 4, 2017

Effective Date: April 1, 2017    402

List Of Exhibits

Benefit Plan Exhibit
Practitioner Roster/Site Of Service Exhibit
Reimbursements Exhibit (s)

Corporate Services,
General Partnership

By: John Doe (Signature Of Representative
Duly Authorized To Sign This
Agreement)

Print/Type    John Doe
Name:

Title:      President

Date:      Apr 3, 2017

404

1:1 Relationship
Recognition And
Preservation

FIG. 4A

Figure 4A:
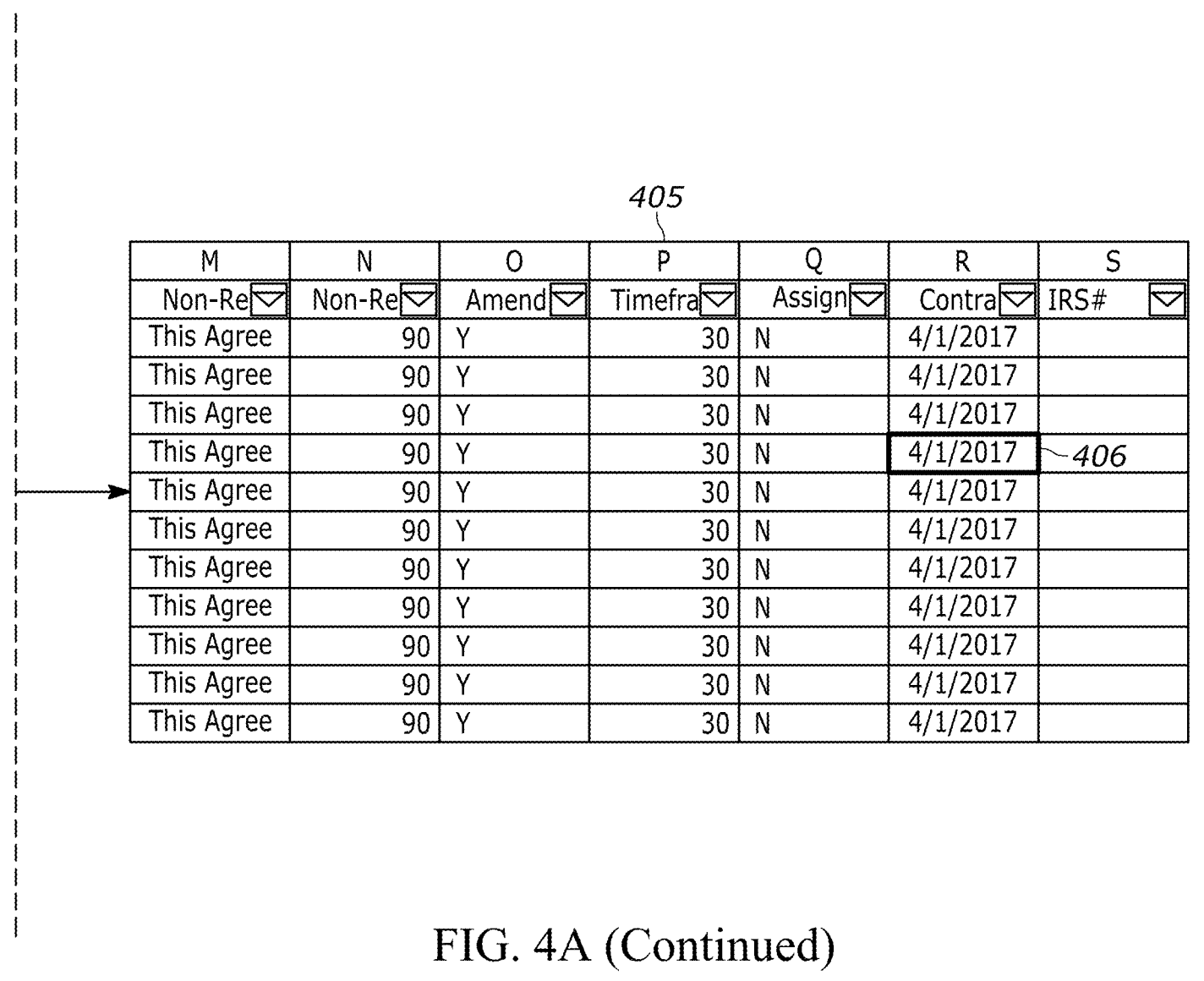

| M | N | O | P | Q | R | S |
|---|---|---|---|---|---|---|
| Non-Re ▷ | Non-Re ▷ | Amend ▷ | Timefra ▷ | Assign ▷ | Contra ▷ | IRS# ▷ |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |
| This Agree | 90 | Y | 30 | N | 4/1/2017 | |

Reimbursement Methodology

X Reimburses The Lesser Of The Fee Billed By Provider Or The Allowed Amount For The Particular Service As Set Forth Below.

421

|  | Effective January 1, 2018 | Effective January 1, 2019 |
|---|---|---|
| Surgery Codes That Require Implants | 220% Of The X Base Rate* | 190% Of The X Base Rate* |
| Surgery Codes That Do Not Require Implants | 250% Of The X Base Rate* | 225% Of The X Base Rate* |
| Payable Ancillary Codes | 110% Of The X Base Rate* | 110% Of The X Base Rate* |

424

For The CPT Codes Outlined Below, The Allowed Amount Will Be The Following:

| CPT Code | Allowed Amount 01-01-2018 | Allowed Amount 01-01-2019 |
|---|---|---|
| 22551 | $15,000 | $13,000 |
| 22856 | $18,500 | $15,000 |
| 25447 | $5,500 | $4,750 |
| 27130 | $13,000 | $12,000 |
| 27447 | $10,000 | $8,500 |
| 63685 | $14,500 | $10,000 |
| 69930 | $22,500 | $20,000 |

422

Effective December 15, 2019:
The Parties Agree To Collaborate On A Continued Glidepath Reduction By Removing $1.4 Million Of Costs, Annually From Anesthesia Services At X By One Of Two Of The Following Options:
- Reductions In Anesthesia Rates Billed To X By The Current Anesthesia Provider Practicing At X, Or
- Bundled Billing Arrangement By The X That Would Also Include Anesthesia Costs That X Would Then Pay The X A Global Payment. The X Would Assume Responsibility For Then Paying The Anesthesia provider
Should The Above Reduction Pathway Not Be Achieved At Least 90 Days Prior To The Effective Date, The

FIG. 4B

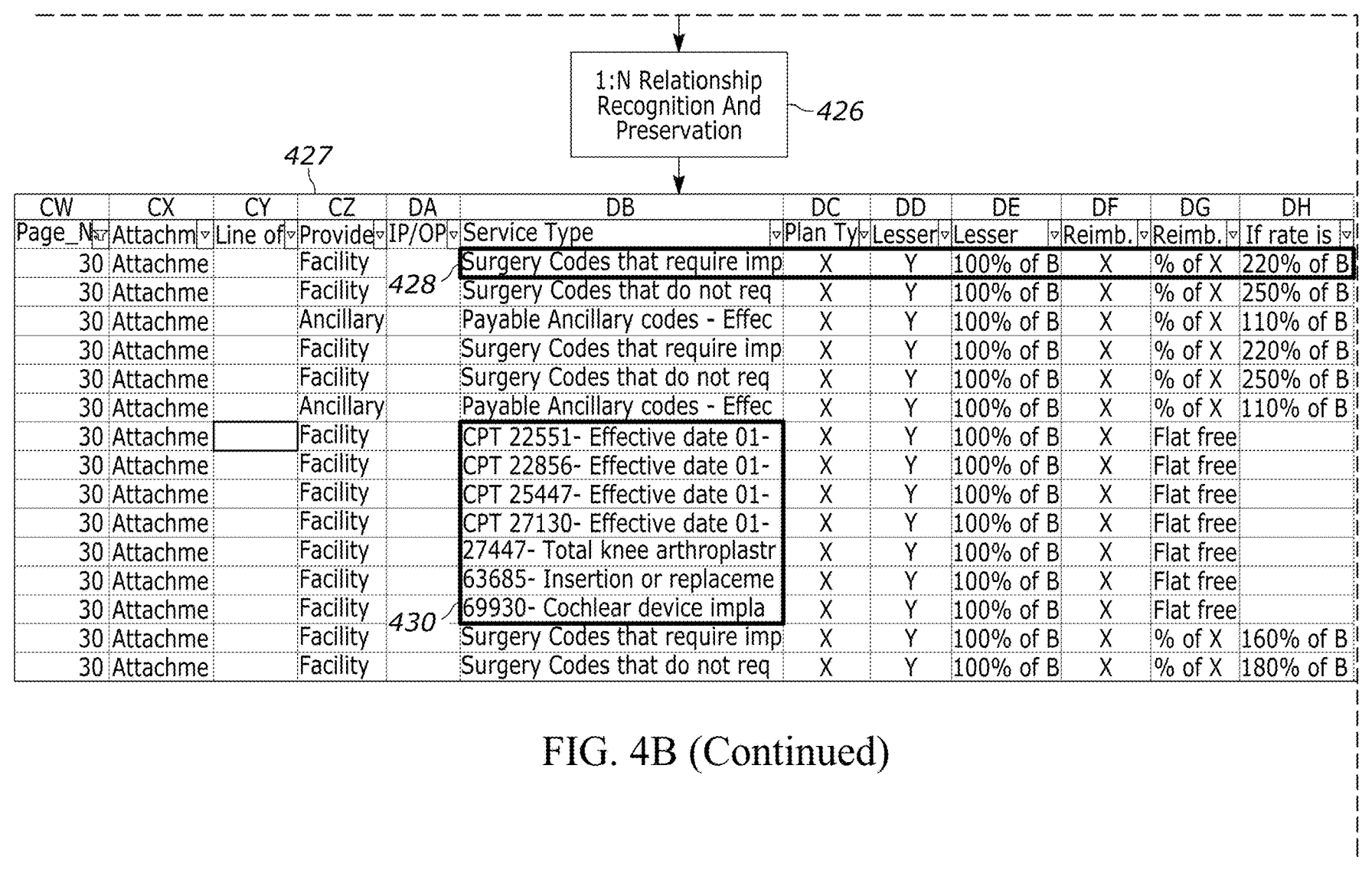

1:N Relationship Recognition And Preservation — 426

427   428   430

| CW | CX | CY | CZ | DA | DB | DC | DD | DE | DF | DG | DH |
|---|---|---|---|---|---|---|---|---|---|---|---|
| Page_N | Attachm | Line of | Provide | IP/OP | Service Type | Plan Ty | Lesser | Lesser | Reimb. | Reimb. | If rate is |
| 30 | Attachme | | Facility | | Surgery Codes that require imp | X | Y | 100% of B | X | % of X | 220% of B |
| 30 | Attachme | | Facility | | Surgery Codes that do not req | X | Y | 100% of B | X | % of X | 250% of B |
| 30 | Attachme | | Ancillary | | Payable Ancillary codes - Effec | X | Y | 100% of B | X | % of X | 110% of B |
| 30 | Attachme | | Facility | | Surgery Codes that require imp | X | Y | 100% of B | X | % of X | 220% of B |
| 30 | Attachme | | Facility | | Surgery Codes that do not req | X | Y | 100% of B | X | % of X | 250% of B |
| 30 | Attachme | | Ancillary | | Payable Ancillary codes - Effec | X | Y | 100% of B | X | % of X | 110% of B |
| 30 | Attachme | | Facility | | CPT 22551- Effective date 01- | X | Y | 100% of B | X | Flat free | |
| 30 | Attachme | | Facility | | CPT 22856- Effective date 01- | X | Y | 100% of B | X | Flat free | |
| 30 | Attachme | | Facility | | CPT 25447- Effective date 01- | X | Y | 100% of B | X | Flat free | |
| 30 | Attachme | | Facility | | CPT 27130- Effective date 01- | X | Y | 100% of B | X | Flat free | |
| 30 | Attachme | | Facility | | 27447- Total knee arthroplastr | X | Y | 100% of B | X | Flat free | |
| 30 | Attachme | | Facility | | 63685- Insertion or replaceme | X | Y | 100% of B | X | Flat free | |
| 30 | Attachme | | Facility | | 69930- Cochlear device impla | X | Y | 100% of B | X | Flat free | |
| 30 | Attachme | | Facility | | Surgery Codes that require imp | X | Y | 100% of B | X | % of X | 160% of B |
| 30 | Attachme | | Facility | | Surgery Codes that do not req | X | Y | 100% of B | X | % of X | 180% of B |

FIG. 4B (Continued)

| DI | DJ | DK | DL | DM | DN | DO |
|---|---|---|---|---|---|---|
| If rate is | Flat Fe | Default | Default | DRG C | High C | High C |
| 2.2 | | X | 100% of | X | determined base rate |
| 2.5 | | X | 100% of | X | determined base rate |
| 1.1 | | X | 100% of | X | determined base rate |
| 2.2 | | X | 100% of | X | determined base rate |
| 2.5 | | X | 100% of | X | determined base rate |
| 1.1 | | X | 100% of | X | determined base rate |
| | $15,000 | X | 100% of | X | determined base rate |
| | $18,500 | X | 100% of | X | determined base rate |
| | $5,500 | X | 100% of | X | determined base rate |
| | $13,000 | X | 100% of | X | determined base rate |
| | $10,000 | X | 100% of | X | determined base rate |
| | $14,500 | X | 100% of | X | determined base rate |
| | $22,000 | X | 100% of | X | determined base rate |
| 1.6 | | X | 100% of | X | determined base rate |
| 1.8 | | X | 100% of | X | determined base rate |

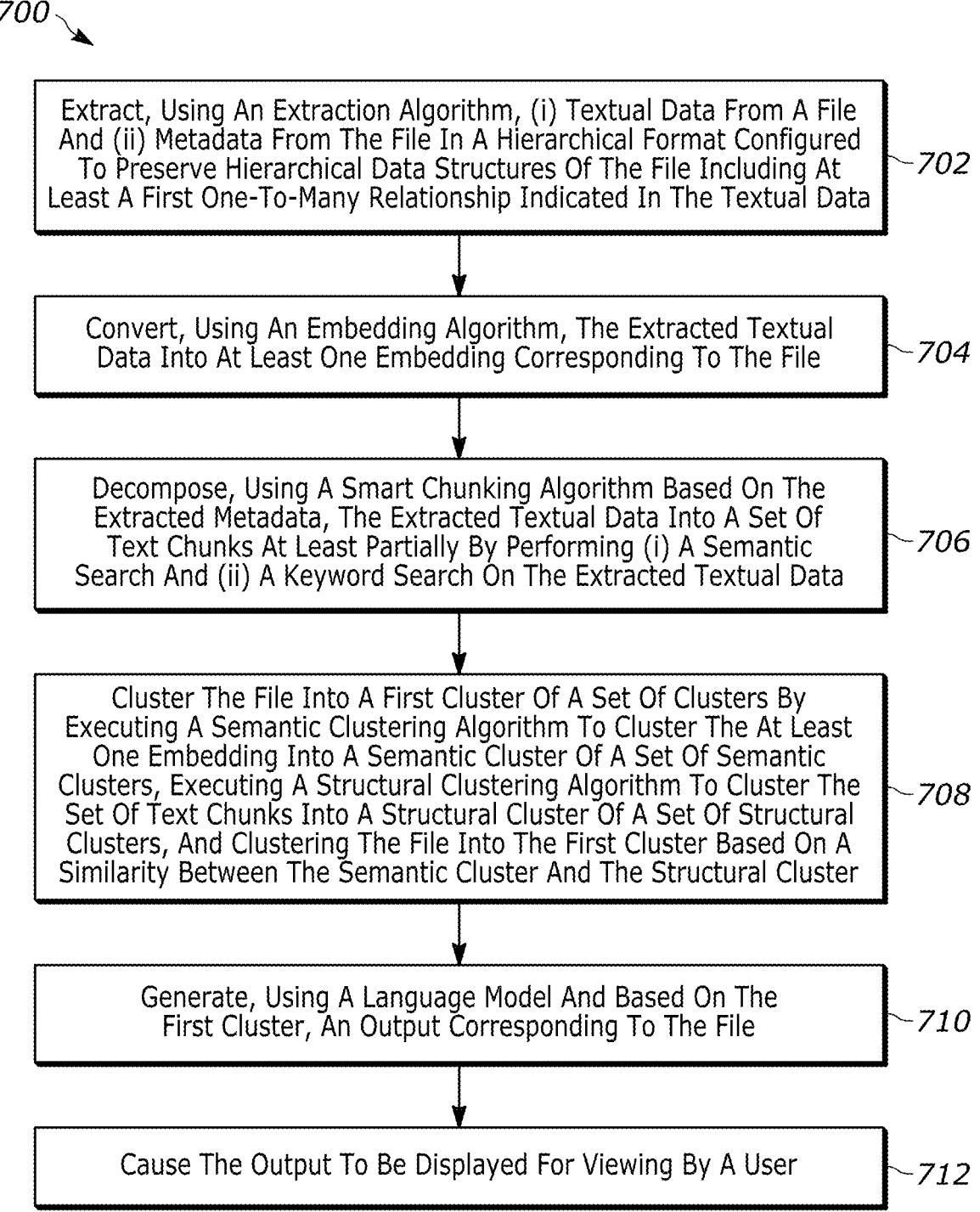

700

Extract, Using An Extraction Algorithm, (i) Textual Data From A File And (ii) Metadata From The File In A Hierarchical Format Configured To Preserve Hierarchical Data Structures Of The File Including At Least A First One-To-Many Relationship Indicated In The Textual Data ~702

Convert, Using An Embedding Algorithm, The Extracted Textual Data Into At Least One Embedding Corresponding To The File ~704

Decompose, Using A Smart Chunking Algorithm Based On The Extracted Metadata, The Extracted Textual Data Into A Set Of Text Chunks At Least Partially By Performing (i) A Semantic Search And (ii) A Keyword Search On The Extracted Textual Data ~706

Cluster The File Into A First Cluster Of A Set Of Clusters By Executing A Semantic Clustering Algorithm To Cluster The At Least One Embedding Into A Semantic Cluster Of A Set Of Semantic Clusters, Executing A Structural Clustering Algorithm To Cluster The Set Of Text Chunks Into A Structural Cluster Of A Set Of Structural Clusters, And Clustering The File Into The First Cluster Based On A Similarity Between The Semantic Cluster And The Structural Cluster ~708

Generate, Using A Language Model And Based On The First Cluster, An Output Corresponding To The File ~710

Cause The Output To Be Displayed For Viewing By A User ~712

FIG. 7

SYSTEMS AND METHODS FOR IMPROVED FILE PROCESSING

TECHNICAL FIELD

The present disclosure generally relates to improved file processing systems and methods, and more particularly, to techniques for extracting, chunking, clustering, and generating outputs based on textual data from files, such as leveraging embedding algorithms, smart chunking algorithms, and clustering algorithms to efficiently and accurately process hierarchical data structures.

BACKGROUND

File processing systems face challenges in extracting structured information from documents that are often lengthy, complex, and unstructured. These documents may include varied formatting features, inconsistent layouts, multi-column designs, and nested metadata, which can complicate computational analysis. Existing techniques often rely purely on generic text analysis systems, such as natural language processing (NLP) and Optical Character Recognition (OCR), which are frequently optimized for flat textual data rather than intricate document structures. As a result, many existing systems may struggle to identify relationships between clauses, metadata fields, and/or table contents, leading to incomplete or inaccurate extraction. Moreover, these existing systems generally do not account for the contextual hierarchy within such documents and fail to preserve connections between disparate data elements.

For example, in many existing systems, file categorization and clustering are primarily based on semantic similarity measures derived from textual content. Techniques such as term frequency-inverse document frequency (TF-IDF) or text embeddings often form the backbone of these clustering methodologies. However, focusing solely on text similarity often results in clusters that fail to distinguish important structural nuances, such as the presence of specific clause formats, table densities, and/or metadata structures. This lack of granularity can lead to inefficiencies in document grouping and processing, particularly when attempting to optimize processing operations for highly domain-specific files. Furthermore, existing text-based extraction methods frequently neglect non-natural language components, such as tables or checkboxes, which further compromises the output accuracy.

Existing metadata extraction tools also tend to operate with rigid algorithms that often overlook the contextual intricacies of hierarchical relationships inherent in many complex files. For example, many existing systems treat terms/clauses/sentences as isolated text elements, ignoring dependencies and associations between these clauses, exhibits, and/or other nested structures. These existing metadata extraction techniques may fail to distinguish one-to-many relationships, such as multiple payment terms linked to different services within the same file, leading to an incoherent dataset unsuitable for downstream analysis. Additionally, the computational overhead in processing unstructured documents often limits scalability, especially when analyzing large volumes of contracts with diverse formats and structures.

SUMMARY OF THE DISCLOSURE

In some aspects, the techniques described herein relate to a computer-implemented system for improved file processing, including: one or more processors; and one or more memories storing computer-executable instructions thereon that, when executed by the one or more processors, cause the computer-implemented system to perform operations including: extracting, using an extraction algorithm, (i) textual data from a file and (ii) metadata from the file in a hierarchical format configured to preserve hierarchical data structures of the file including at least a first one-to-many relationship indicated in the textual data, converting, by an embedding algorithm, the extracted textual data into at least one embedding corresponding to the file, decomposing, using a smart chunking algorithm based on the extracted metadata, the extracted textual data into a set of text chunks at least partially by performing (i) a semantic search and (ii) a keyword search on the extracted textual data, clustering the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster, generating, by a language model and based on the first cluster, an output corresponding to the file, and causing the output to be displayed for viewing by a user.

In some aspects, the techniques described herein relate to a non-transitory computer-readable medium storing instructions thereon that, when executed by one or more processors, cause the one or more processors to: extract, using an extraction algorithm, (i) textual data from a file and (ii) metadata from the file in a hierarchical format configured to preserve hierarchical data structures of the file including at least a first one-to-many relationship indicated in the textual data; convert, by an embedding algorithm, the extracted textual data into at least one embedding corresponding to the file; decompose, using a smart chunking algorithm based on the extracted metadata, the extracted textual data into a set of text chunks at least partially by performing (i) a semantic search and (ii) a keyword search on the extracted textual data; cluster the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster; generate, by a language model and based on the first cluster, an output corresponding to the file; and cause the output to be displayed for viewing by a user.

In some aspects, the techniques described herein relate to a computer-implemented method for improved file processing, the computer-implemented method including: extracting, by one or more processors and using an extraction algorithm, (i) textual data from a file and (ii) metadata from the file in a hierarchical format configured to preserve hierarchical data structures of the file including at least a first one-to-many relationship indicated in the textual data; converting, by the one or more processors using an embedding algorithm, the extracted textual data into at least one embedding corresponding to the file; decomposing, by the one or more processors using a smart chunking algorithm based on the extracted metadata, the extracted textual data into a set of text chunks at least partially by performing (i) a semantic search and (ii) a keyword search on the extracted textual data; clustering, by the one or more processors, the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster; generating, by the one or more processors using a language model and based on the first cluster, an output corresponding to the file; and causing, by the one or more processors, the output to be displayed for viewing by a user.

BRIEF DESCRIPTION OF THE DRAWINGS

The figures described below depict embodiments for purposes of illustration only. One skilled in the art will readily recognize from the following discussion that alternative embodiments of the systems and methods illustrated herein may be employed without departing from the principles of the disclosure described herein. The detailed description is described with reference to the accompanying figures. In the figures, the same reference number appearing in different figures indicates a same or similar item.

FIG. 4A depicts a one-to-one relationship preservation sequence corresponding to the data extraction processes described herein, and in accordance with various embodiments described herein.

FIG. 4B depicts a one-to-many relationship preservation sequence corresponding to the data extraction processes described herein, and in accordance with various embodiments described herein.

FIG. 7 depicts a third flow diagram representing an example computer-implemented method, in accordance with various embodiments described herein.

DETAILED DESCRIPTION

Figure 1:
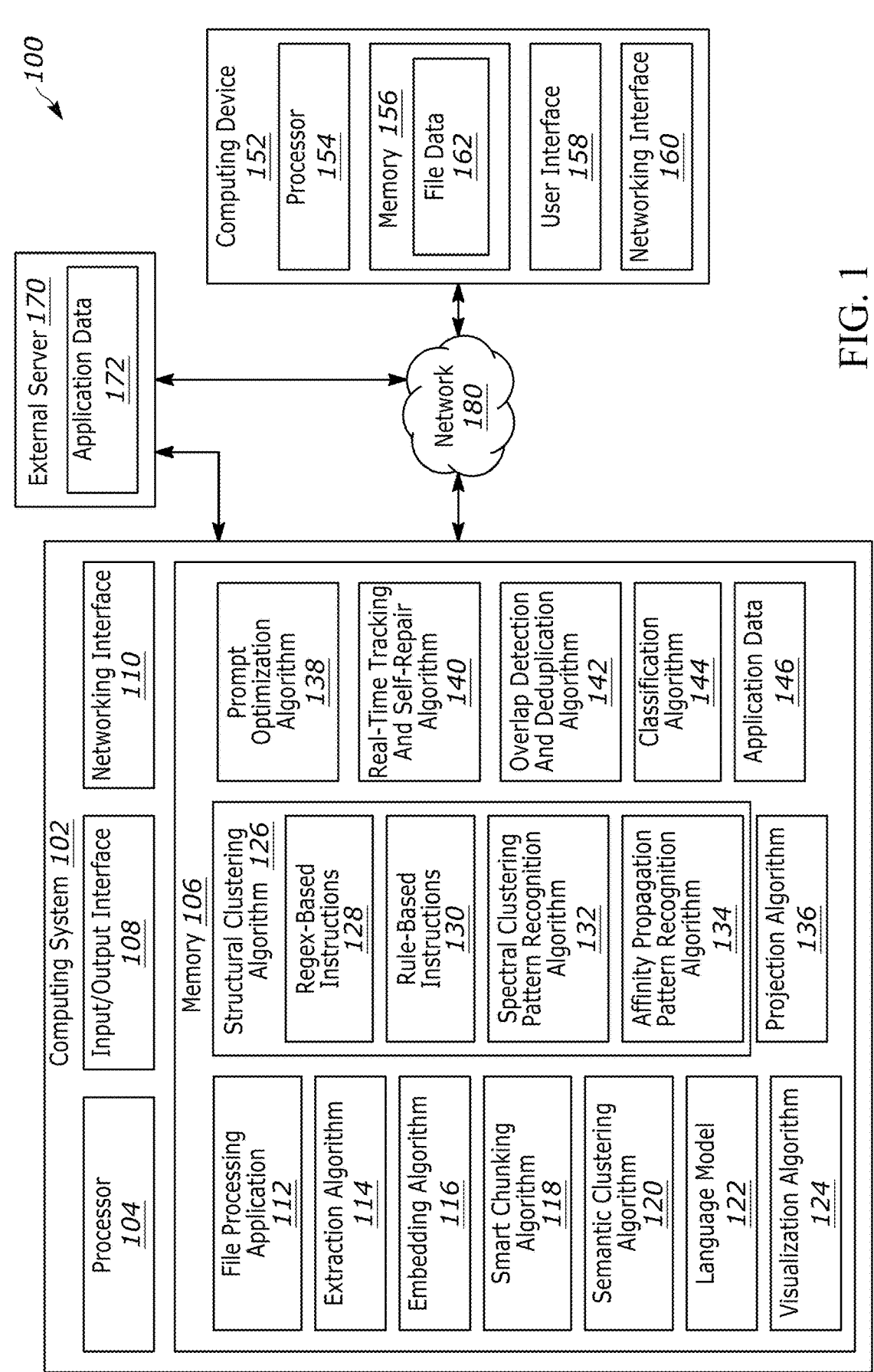
FIG. 1 depicts an example system in which various embodiments of the present disclosure may be implemented.

The present techniques generally involve extracting, decomposing, clustering, and validating data from complex, unstructured files using artificial intelligence (AI)-driven approaches. These present techniques integrate numerous AI techniques/models, such as OCR, NLP, Generative AI (GenAI), clustering methodologies, prompt optimization, and knowledge graph-based storage formats to convert unstructured textual data (also referenced herein as "text" data) into structured outputs. The present techniques generally introduce specific computer-implemented processes that improve accuracy, computational efficiency, and scalability while addressing persistent technical challenges related to the preservation of complex data relationships, metadata validation, and clustering accuracy/efficiency.

As generally referenced herein, a file may be unstructured insofar as any data extracted from that file (e.g., via OCR) may lack formal organizational markers that clearly define structural elements of the file (e.g., sections, headings, delineated content). Upon extraction, the text content may be presented as continuous strings of characters without explicit indicators of the hierarchical relationships or the intended structural divisions present in the original file, creating several common challenges that existing techniques struggle to overcome. For example, the extraction process often fails to fully capture the original layout and formatting of a file, leading to a loss of visual cues that help distinguish different sections and components within the file. Further, existing systems analyzing extracted text generally lack the contextual awareness that human readers possess, making it challenging for such existing systems to infer the intended structure, infer relationships between elements, and/or identify key components that define the file's organization. These challenges are further amplified when existing systems attempt to analyze intricate contractual language, nested clauses, and/or non-standard formatting, leading to substantial accuracy reductions when performing parsing, text segmentation, entity recognition, and/or pattern identification. Accordingly, these additional issues can contribute to the perceived unstructured nature of the extracted textual data, requiring additional processing steps for structural analysis and organization.

More specifically, and as mentioned, existing solutions often rely solely on text-based similarity or simplistic one-dimensional extraction methods that fail to accurately preserve relationships between/among data included in such files and/or to otherwise accurately capture the nuanced implications of such data. For example, existing systems often struggle to extract nested file metadata while preserving relationships between clauses, terms, and/or data points. A contract document may specify, e.g., multiple "time-to" clauses such as "time to remit payment" with associated durations for specific services, and existing (naïve) extraction methods fail to properly associate these durations to their respective clauses. Namely, purely text-based similarity extraction methods generally prioritize matching keywords or patterns without considering the contextual relationships between different elements within the document and therefore causes the underlying computing device to overlook the nuanced implications and semantic connections between clauses and associated data points, leading to a lack of accuracy in preserving these relationships. Similarly, one-dimensional extraction methods typically focus on extracting individual data elements without considering the hierarchical or relational structure of the file, which causes the computing device executing this extraction method to fail to accurately preserve the associations between different components within the file. Existing techniques suffer from other limitations, such as failing to capture/preserve nested metadata, that generally result in such existing techniques failing to preserve complex data relationships from unstructured files.

Further, existing techniques often overleverage machine learning (ML) solutions to group similar files together, which can strain processing resources. Other existing techniques that avoid reliance on ML models, such as semantic similarity alone, often misclassify files due to linguistic resemblance without focusing on structural features that define files types. For example, professional, ancillary, and facility contracts, despite similar wording, vary significantly in their structures. Existing techniques often erroneously group/classify such contracts together due to inadequate consideration of structural features, which impacts the accuracy of file categorization and introduces inefficiencies in processing cycles and computational resource utilization. As just a few examples, (1) misclassification generally triggers additional processing tasks, such as reevaluation or reclassification of files, consuming extra computational resources and increasing processing time; (2) misclassification can introduce algorithmic complexities, such as the need for additional error handling mechanisms or reprocessing steps to correct misclassifications; and (3) misclassification can introduce data integrity issues, affecting the accuracy and reliability of downstream analyses. Thus, existing techniques generally strain processing resources at least through overreliance on ML models and/or by overreliance on semantic similarity techniques.

The present techniques overcome these and other challenges associated with existing techniques. For example, the present techniques overcome the challenges existing techniques face regarding data relationship preservation by organizing multi-layered data (e.g., extracted metadata and/or textual data) in hierarchical structures, such as JSON schemas, that maintain these associations so the present systems may leverage both structural and semantic analyses to accurately evaluate the file data. This hierarchical organization ensures that even 1-to-many relationships, like those found in reimbursement terms or pricing structures, are preserved in a machine-readable format. As a result, downstream systems leveraging these structured outputs gain enhanced functionality compared to systems using flattened or unassociated data representations.

For example, through this hierarchical organization of data, downstream systems (e.g., clustering systems described herein) can achieve improved data accessibility, better navigability through interconnected information, and enhanced capabilities for data decomposition, chunking, clustering, and manipulation. Namely, the hierarchical formatting of the extracted metadata allows for a systematic and structured representation of the relationships and dependencies within the extracted textual information. By encapsulating multi-layered textual data in nested hierarchies, the hierarchical structure provides a clear and intuitive way to organize and access data elements based on their contextual relationships. This structured approach facilitates efficient navigation through interconnected information, enabling downstream systems to traverse and interpret the data more effectively.

Additionally, the hierarchical format supports more advanced data analysis and extraction functionalities by preserving complex associations, such as 1-to-many relationships, in a machine-readable format. This allows for more precise and granular manipulation of the data, facilitating tasks such as semantic analysis, pattern recognition, and relationship mapping. The hierarchical structure also enhances data integrity and consistency, ensuring that related information is logically grouped (e.g., relationships between fields and values (e.g., reimbursement terms) remain intact during analysis) and can be easily identified and processed by downstream applications (e.g., via the file processing application). Overall, the hierarchical organization/formatting of extracted metadata not only simplifies data access and interpretation but also empowers downstream systems with the capabilities to perform sophisticated analyses, which existing techniques are generally incapable of achieving.

As one example, the hierarchical format may preserve structural file components, such as contract tables and non-natural language structures. By converting tabular data into structured, text-based formats (e.g., a serialized or raw-text version of a JSON format), the present techniques enable downstream AI models, including large language models (LLMs), to interpret (1) the data itself and (2) the implications of formatting and relationships within rows, columns, and merged cells. For instance, if a table maps reimbursement percentages to specific services, the present techniques capture this association in a retrievable format accessible to such text-based AI/ML systems (e.g., LLMs). This approach therefore at least improves the function of such existing text-based AI/ML systems by minimizing errors in context interpretation, especially in complex file structures, and consequently enhancing the depth of analysis these systems can achieve. Moreover, this structured output allows LLMs to efficiently process high-volume, complex data without encountering errors stemming from lost relationships between metadata points, thereby reducing computational overhead requirements.

The present techniques also address the shortcomings of existing techniques by combining semantic content analysis and structural layout analysis in dual-layer clustering methodologies. These techniques efficiently categorize files based on meaning encoded in their text and the structural properties derived from formatting conventions such as table density, section headings, and/or metadata arrangement, among others. This dual-layer clustering strategy enables a more comprehensive and nuanced categorization of files, leveraging both semantic context and structural features to group similar files together. By incorporating these multiple layers of analysis, the present techniques achieve a high level of analytical granularity and accuracy in file clustering without sacrificing precision.

Namely, unlike some existing ML clustering techniques that may rely solely on text similarity without considering structural cues, the present dual-layer clustering methodologies capture a holistic view of the content and layout of files, enhancing the clustering process with a richer set of features for classification. The integration of semantic and structural analysis thereby ensures that the resulting file clusters are more robust, reflective of both content meaning and layout characteristics, and capable of delivering precise and accurate groupings without compromising analytical granularity. Thus, by integrating content-based and structure-based data clustering, the present techniques reduce the reliance on processor-intensive ML models from which existing techniques frequently suffer while preserving analytical granularity, enabling the present techniques to perform the file clustering and processing described herein at a scale existing techniques are unable to match. This approach therefore overcomes inefficiencies present in existing methods that overuse ML solutions, fail to consider structural features, and consequently misclassify files.

Therefore, the present techniques offer a substantial advancement over existing systems by addressing several challenges faced by such existing systems. The present techniques enable the preservation of intricate associations within multi-layered data through hierarchical structuring, particularly allowing for the retention of 1-to-many relationships in a machine-readable format. The structured outputs empower downstream systems with enhanced data accessibility, navigability, decomposition, and manipulation capabilities, significantly improving the efficiency of data interpretation, as compared to existing systems. Moreover, by combining semantic and structural analyses in dual-layer clustering methodologies, the present techniques ensure a more nuanced categorization of files based on both meaning and layout characteristics, resulting in precise and accurate groupings without sacrificing analytical granularity. These innovations represent notable improvements upon existing system that often struggle with preserving data integrity and achieving sophisticated analyses, marking a significant advancement in data/file processing efficiency and accuracy.

In certain embodiments, the present techniques incorporate several additional elements that further improve over existing techniques. For example, the present techniques may decompose textual data into text chunks using a smart chunking algorithm, involving determining contextual similarity between extracted portions, setting chunk size and overlap parameters based on the similarity, and generating preliminary text chunks. The present techniques may further apply sequential identifiers to these preliminary text chunks and group them based on semantic and keyword search outputs and associated fields.

These embodiments of the present techniques generally provide a technical advantage over existing techniques in various respects. The contextual similarity analysis and dynamic adjustment of chunk parameters based on the contextual similarity enable a more precise and adaptable approach to chunking, as compared to existing fixed-size methods. By relating chunks to both the context and each other, the present techniques can capture nuanced information relationships within the data that might otherwise be missed. The grouping step based on semantic and keyword searches, considering the associated field of the data portions, enhances the coherence and organization of the extracted text chunks and ensures that related information is logically grouped together, facilitating downstream processing and analysis. Thus, these embodiments of the present techniques improve the efficiency and accuracy of data processing by enabling a more precise and contextually aware decomposition of textual data, leading to more meaningful and structured outputs. The integration of dynamic chunking parameters and semantic-based grouping strategies enhances the present techniques' ability to handle complex and interconnected information, contributing to improved data accessibility, navigability, and analytical capabilities.

In some embodiments, the present techniques determine whether a field group (e.g., collection of text chunks from one or more different fields) meets a chunk threshold, to perform subsequent functions that ultimately reduces redundant processing by grouping/batching related fields, unlike existing systems that process each field separately. Specifically, if a field group meets/satisfies the threshold, the present techniques may merge text chunks, identify and remove redundant portions, reorder non-redundant sections, and extract the processed text chunk. On the other hand, if a field group fails to meet/satisfy the threshold, at least one chunk from another field group may be merged with the group's text chunks, and similar processing may follow.

These techniques offer a significant technical advantage relative to existing techniques by enhancing data processing efficiency through substantial reductions in processing redundancy. By organizing the preliminary text chunks into more coherent and structured text, the present techniques leverage overlap detection and deduplication algorithms to eliminate redundancy and streamline the information. This process ensures that relevant information is consolidated logically, improving data accessibility and interpretability. Moreover, the present techniques reordering non-redundant sections facilitates more effective data analysis and manipulation, enabling downstream systems to execute sophisticated tasks such as semantic analysis and corresponding clustering. These capabilities result in enhanced data integrity and consistency, ensuring that the processed information remains logically grouped and easily accessible for further applications, thereby overcoming challenges related to data relationship preservation and unstructured data analysis faced by existing techniques.

In certain embodiments, the present techniques utilize a structural clustering algorithm that specifically leverages/executes regular expressions (regex)-based heuristic instructions, rule-based heuristic instructions, a spectral clustering pattern recognition algorithm, and/or an affinity propagation pattern recognition algorithm. These elements collectively enhance the precision, adaptability, and performance of the data clustering process. For example, the regex-based and rule-based heuristic instructions enable the detection of common clause structures, keywords, and formatting patterns associated with the file, facilitating a more targeted and accurate identification of relevant data components than existing non-structural techniques can provide. By incorporating these heuristic instructions, the algorithm of the present techniques can readily identify and extract relevant information through structural similarities, improving the accuracy of the clustering process, as compared to existing techniques that rely on purely semantic approaches.

Moreover, the execution of a spectral clustering pattern recognition algorithm enhances the algorithm's capability to identify clusters within the structural data based on file structural components (e.g., headings, sections, subsections). This methodical approach leverages the inherent structural characteristics of the data to identify meaningful clusters, leading to more coherent and informative groupings. In contrast to existing techniques that may overlook structural nuances, this algorithmic strategy ensures that the clustering process is guided by the underlying structural intricacies of the data, thereby improving the accuracy and relevance of the clusters generated.

Additionally, utilizing an affinity propagation pattern recognition algorithm further refines the clustering process by grouping the file into structural clusters based on formatting features. By considering formatting aspects in the clustering process, such as layout and presentation characteristics, the algorithm can create clusters that align with the visual and organizational cues present in the data. This approach enhances the coherence and organization of the resulting clusters, enabling a more intuitive and structured representation of the data than existing techniques that commonly ignore such visual/organizational cues.

Overall, incorporating any of these techniques as part of the structural clustering algorithm offers a technical advantage by improving the accuracy, precision, adaptability, and efficiency of the clustering process. By integrating heuristic instructions, spectral clustering, and/or affinity propagation algorithms, the structural clustering algorithm can effectively identify, extract, and cluster data components with a higher degree of accuracy and relevance than existing methods. Namely, this structural approach ensures that the clustering process is informed by both the content and structure of the data, leading to more accurate outcomes when the underlying computing devices process/analyze the file to generate responses/outputs.

In some embodiments, the present techniques further include clustering the file into a cluster based on the similarity between a semantic cluster and a structural cluster, determined by the semantic/structural clustering algorithms, respectively. The present techniques perform this cluster combination in a manner that provides a technical advantage by incorporating algorithms and visualization techniques that enhance data processing efficiency and accuracy. By utilizing a projection algorithm to generate a two-dimensional (2D) projection and a cross-tabulation heatmap indicating the similarity between the semantic cluster and the structural cluster, the present techniques develop a more comprehensive understanding of the interrelationships within the data represented by the respective semantic/structural clusters. This approach improves upon existing techniques by facilitating a more precise and adaptable clustering process, offering a deeper insight into the complex data relationships present in unstructured files. In doing so, the present techniques can perform the final clustering (e.g., from the semantic/structural clusters) in a manner that clearly and accurately relies on the degrees of similarity between an input file and other files without the ambiguity or inaccuracy that purely semantic analyses frequently provide.

In certain embodiments, the present techniques employ a prompt optimization algorithm and a language model in a manner that enhances the efficiency and accuracy of operations performed on extracted textual data from files. The prompt optimization algorithm determines the file class, generates a prompt based on the extracted data, the first cluster, and the file class, and subsequently produces an output derived from the language model. The algorithm further utilizes training techniques like few-shot learning or multi-shot learning to enrich the prompt optimization process, thereby improving the precision of the language model. Furthermore, the algorithm dynamically updates prompts based on the language model outputs to enhance the adaptability and effectiveness of the prompt generation performed as part of the present techniques.

These embodiments overcome certain challenges associated with existing techniques that, as mentioned, often struggle to accurately capture complex data relationships and structural nuances within unstructured files. Specifically, the algorithm facilitates determining the file class, tailoring prompts based on extracted data and file class, and generating outputs derived from the language model. This approach addresses challenges faced by existing methods in accurately capturing complex data relationships and structural nuances within unstructured files. By dynamically updating prompts based on the language model outputs, the prompt optimization algorithm provides a more precise and adaptable approach to prompt generation compared to existing fixed-size methods. This allows for the capture of nuanced information relationships within the data that might otherwise be missed by traditional techniques.

Moreover, the algorithm's ability to dynamically adjust prompts based on language model outputs improves the efficiency and accuracy of prompt generation. This contrasts with existing approaches that typically lack contextual awareness, making it challenging for them to infer relationships between elements and accurately capture the structural nuances of unstructured files. By integrating this dynamic approach, the algorithm overcomes the limitations of existing text-based similarity or simplistic extraction methods that struggle to preserve relationships and capture the implications of data accurately. Additionally, the prompt optimization algorithm's focus on updating prompts based on language model outputs contributes to improved data accessibility, navigability, and analytical capabilities by ensuring that related information is logically grouped together for downstream processing and analysis.

Through the integration of dynamic training and updating methodologies, the present techniques ensure a more contextually aware and adaptable process for handling textual data, leading to improved data processing efficiency and accuracy. By continuously refining and adjusting the prompt generation process based on the language model's outputs (e.g., leveraging dynamic language model training techniques), the present techniques can adapt to the evolving nature of the data, improving the accuracy and efficiency of data processing processes. For example, the application of few-shot learning and multi-shot learning enriches the prompt optimization process, enhancing the overall precision of the language model. This enrichment enables the present techniques to overcome challenges existing techniques face related to accurately capturing the complex relationships within unstructured textual data. By dynamically adjusting the prompt generation process based on model outputs, the present techniques ensure that related information is logically grouped together, facilitating downstream processing and analysis. Thus, the incorporation of dynamic language model training techniques elevates the efficiency, accuracy, and adaptability of the present techniques in processing unstructured textual data relative to existing techniques, ultimately improving data accessibility, navigability, and analytical capabilities for the underlying computing systems.

In some embodiments, the present techniques incorporate a real-time tracking and self-repair algorithm to address failed or incomplete processes within operations such as extracting, converting, decomposing, clustering, or generating data. Many existing techniques do not incorporate real-time or self-repair functionalities, particularly when leveraging ML techniques, as such functionality would further increase the already overbearing strain such over-leveraged ML techniques impose on computational resources. In contrast, the present techniques enable the computing systems described herein to independently identify and determine issues associated with current or prior processes, followed by the adjustment of parameters based on these determinations, without encountering similar computational overhead issues.

Specifically, these algorithms enable immediate detection and response to errors or interruptions in the processing chain without requiring ML-based techniques, leading to improved operational efficiency by minimizing downtime and potential data loss. This ensures that file processing remains uninterrupted despite potential anomalies without occupying significant computational resources, improving system stability and dependability for large-scale document processing at scale. Furthermore, by dynamically adjusting parameters of the current or prior processes based on real-time analysis, the present techniques can optimize performance and accuracy, thereby enhancing the overall reliability and quality of the processed data. This approach contrasts with conventional methods that may lack the ability to efficiently self-correct or adapt parameters based on real-time feedback.

In certain embodiments, and as mentioned, the present techniques extract metadata from a file by an extraction algorithm and store the metadata in a hierarchical format that signifies at least one field related to the file. This field is associated with nested data that indicates the structured nature of the extracted textual data corresponding to the field. By implementing this specific hierarchical format to structure the extracted metadata, the present techniques are further able to preserve the contextual relationships and dependencies within the extracted textual information. This structured representation enables the computing device ana- lyzing the extracted textual data to more efficiently navigate through the interconnected data than existing techniques that ignore, are incapable of interpreting/extracting, and/or oth- erwise overlook such structural information encoded in nested data included as part of a file. This hierarchical format supports advanced data analysis functionalities performed by the downstream computing components, such as seman- tic analysis and relationship mapping, by preserving com- plex associations in a machine-readable format, thereby enabling such computing components to perform such func- tions and/or at least perform such functions more accurately.

Still further, the present disclosure includes specific fea- tures that demonstrate, in various embodiments, particular useful applications, e.g., extracting, using an extraction algorithm, textual data from a file into a hierarchical format to preserve at least a first one-to-many relationship indicated in the textual data; converting, by an embedding algorithm, the extracted textual data into at least one embedding corresponding to the file; decomposing, using a smart chunking algorithm, the extracted textual data into a set of text chunks at least partially by performing (i) a semantic search and (ii) a keyword search on the extracted textual data; clustering the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and/or clustering the file into the first cluster based on a similarity between the semantic cluster and the structural cluster, among others.

Of course, it should be appreciated that the advantages and technical improvements described above and elsewhere herein are not the only advantages and/or technical improve- ments that may be realized as a result of the techniques described herein. Other advantages and/or technical improvements to other technologies or technical fields may be apparent to one of ordinary skill in the art.

Further, while described herein primarily in terms of contract processing, it should be appreciated that this is for the purposes of discussion only, and that the techniques described herein may apply to various file analysis pro- cesses. More specifically, while described herein primarily in terms of a contract, the files described herein may be or include various file/document classes that include textual and/or non-textual data. For example, the files described herein may be or include invoices, medical records, research papers, emails, legal documents, social media content, images/video, audio transcripts, video subtitles, forms, pre- sentations, tables, spreadsheets, web content, and/or any other suitable files or combinations thereof.
Example System FIG. 1 depicts an example system 100 in which various embodiments of the present disclosure may be implemented. The example system 100 may generally be configured to process/analyze complex, unstructured files using AI-driven methods. Depending on the embodiment, the example sys- tem 100 may include a computing system 102 equipped with a processor 104, a memory 106, an I/O interface 108, and a networking interface 110. The memory 106 may store a variety of components including a file processing applica- tion 112, an extraction algorithm 114, an embedding algo- rithm 116, a smart chunking algorithm 118, a semantic clustering algorithm 120, a language model 122, a visual- ization algorithm 124, a structural clustering algorithm 126, a set of regex-based instructions 128, a set of rule-based instructions 130, a spectral clustering recognition algorithm 132, an affinity propagation pattern recognition algorithm 134, a projection algorithm 136, a prompt optimization algorithm 138, a real-time tracking and self-repair algorithm 140, an overlap detection and deduplication algorithm 142, a classification algorithm 144, and a set of application data 146. While referenced herein in the singular, this is for the purposes of discussion only, and it should be understood that any of the processors, memories, interfaces, devices, and/or servers described herein may include multiple (e.g., dozens, hundreds, etc.) instances of such processors, memories, interfaces, devices, and/or servers.

Generally, the computing system 102 is configured to receive an input file from a computing device 152 and process the file, in accordance with the various applications, algorithms, and models, described herein. The computing device 152 may include a processor 154, a memory 156, a user interface 158, and a networking interface 160. The memory 156 may store a set of file data 162, which may be or include the file (e.g., a contract document) and/or any additional data related to the file. Upon receiving the file from the computing device 152, the computing system 102 may process the file using any of the various applications, algorithms, and models, described herein and/or may utilize an external server 170 to perform some of the functions described herein. For example, the external server 170 may include application data 172 that may be or include the application data 146 stored in the memory 106 of the computing system 102, such that the computing system 102 may leverage one or more external devices/resources, e.g., as part of a cloud-based environment to facilitate the various functions described herein. Moreover, each of the comput- ing system 102, the computing device 152, and the external server 170 may communicate via a network 180 configured to facilitate signal transmissions between/among the various components included as part of the system 100 and/or as otherwise described herein.

In any event, when the computing system 102 receives the input file from the computing device 152 the computing system 102 may execute the file processing application 112 to initiate file processing functions. The file processing application 112 may generally be or include a set of instruc- tions defining the operations and behavior of a software platform that is configured to streamline and optimize vari- ous functions associated with processing files, such as contracts and/or various other file classes (e.g., invoices, medical records, research papers, emails, legal documents, social media content, images/video, audio transcripts, video subtitles, forms, presentations, tables, spreadsheets, web content). This application 112 serves as a comprehensive platform for executing tasks that may be defined by various algorithms stored in the memory 106, such as text and metadata extraction, text chunking and clustering for orga- nizing content hierarchically, prompt generation and opti- mization for language models, refining and training lan- guage models, refining the output generated by the language model, storing inputs, intermediate data outputs, and/or final generated outputs, and/or displaying and presenting the processed output in a user-friendly format. More specifi- cally, the file processing application 112 may instruct and/ or otherwise cause the processor 104 to execute the various algorithms and models illustrated in FIG. 1 and described herein to perform these, and other, functions.

The extraction algorithm 114 is generally configured to process textual data and metadata from a file in a hierarchi- cal format designed to preserve the file's hierarchical data structures. At a high level, the algorithm 114 may cause the processor 104 to analyze a raw data file from the computing device 152 and extract text data and metadata from the raw data file. The extraction algorithm 114 may receive a file as input that contains both text data and metadata. The file may be in various formats such as a PDF or image file, and the extraction algorithm 114 may initially cause the processor 104 to preprocess the file, such as by converting non-searchable electronic files (e.g., non-searchable PDFs) into digital format (e.g., digitizing the files). The extraction algorithm 114 may cause the processor 104 to extract textual content using techniques like Optical Character Recognition (OCR) for scanned documents or direct text extraction for digital text files. Additionally, or alternatively, the extraction algorithm 114 may cause the processor 104 to utilize any suitable extraction technique(s), such as document layout analysis, named entity recognition (NER), Regex, NLP, text parsing/mining, etc.

For example, the algorithm 114 may cause the processor 104 to utilize metadata extraction to identify and extract metadata elements such as document properties, time-stamps, author information, and/or other descriptive attributes. The metadata extracted as a result may include and/or otherwise indicate/represent various fields within the file. These fields may vary depending on the file type and/or the information that is valuable for categorization, searchability, and management. These fields may include, e.g., a title field representing the title or name of the file, an author field indicating an individual or entity responsible for creating the file, a creation date field that captures the date on which the file was created or originated, a modification date field denoting the date when the file was last edited or modified, a file type field indicating the format or type of file, such as PDF, Word document, spreadsheet, image, etc., a keywords field including relevant terms or phrases associated with the content of the file for search and retrieval purposes, a subject field providing a brief description or summary of the main topic or subject matter of the file, a description field that offers a detailed description or abstract of the file content, a tags field including descriptive labels or categories assigned to the file for classification and organization, a source field identifying the origin or the entity from which the file originates, an identifier field representing a unique identifier assigned to the file for tracking and reference purposes, and/or a location field denoting the physical or digital location of the file within a filing system or repository.

As part of the instructions comprising the algorithm 114, the processor 104 may also perform various post-extraction techniques, such as text segmentation and/or metadata parsing. In these instances, the algorithm 114 may cause the processor 104 to segment the extracted text data into structural components such as paragraphs, headings, sections, subsections, and/or sentences to facilitate further analysis and processing. When performing metadata parsing, the algorithm 114 may cause the processor 104 to parse the extracted metadata to capture specific metadata fields and attributes defined within the file, such as document title, creation date, and/or keywords. Further, the algorithm 14 may cause the processor 104 to extract relationships between entities, terms, or sections within the text data to capture connections and dependencies present in the content, and these relationships may be encoded in the metadata as part of the hierarchical structure that preserves these relationships in a machine-readable format.

Further, the algorithm 114 may cause the processor 104 to enrich the metadata by, e.g., associating the metadata with relevant text data structures, providing context and enhancing the understanding of the file's content and organization. The algorithm 114 may additionally cause the processor 104 to hierarchically structure the extracted metadata and/or textual data to maintain relationships (e.g., 1-to-1 and/or 1-to-many relationships), categorize information, and organize the content for easier interpretation and analysis. Ultimately, the extraction algorithm 114 may cause the processor 104 to generate a structured output in a machine-readable format (e.g., JSON, XML, or a structured database format) containing the extracted text data and metadata in the hierarchical structure.

In certain embodiments, the extraction algorithm 114 may also cause the processor 104 to perform a semantic analysis on the extracted data, to, e.g., identify key entities, relationships, and/or concepts within the extracted content. For example, the algorithm 114 may cause the processor 104 to utilize NER and/or NLP techniques to perform this semantic analysis. Moreover, the extraction algorithm 114 may cause the processor 104 to perform quality assurance checks/validation on the extracted text data and metadata to ensure accuracy, completeness, and consistency in the extracted information.

The embedding algorithm 116 may generally cause the processor 104 to convert textual data extracted from files into numerical representations, known as embeddings, that capture the semantic meaning and contextual relationships present within the text. The embedding functions performed as result of the processor 104 executing the embedding algorithm 116 may involve encoding the extracted textual data into a lower-dimensional vector space, where words, phrases, and/or complete files are represented as dense numerical vectors. These embeddings effectively capture the semantic properties of the text, enabling machine learning models to process and analyze the textual content more effectively. The embedding algorithm 116 may cause the processor 104 to leverage techniques such as word embeddings (e.g., Word2Vec, GloVe), sentence embeddings (e.g., Universal Sentence Encoder), and/or document embeddings (e.g., Doc2Vec) to map the extracted textual data into a continuous vector space. By converting the textual data into embeddings, the algorithm 116 facilitates tasks such as semantic similarity analysis, language modeling, file classification/clustering, sentiment analysis, and information retrieval.

The smart chunking algorithm 118 is generally configured to cause the processor 104 to decompose the extracted textual data into a set of text chunks based on the extracted metadata from the file, semantic search results, and/or keyword search outputs. In the decomposition process, the algorithm 118 may cause the processor 104 perform semantic and keyword searches on the extracted textual data to identify relevant insights and content patterns. In this manner, the algorithm 118 may cause the processor 104 to combines semantic (vector-based) searching and keyword-based retrieval to identify the most relevant file sections for each extraction field (e.g., associated with the metadata), balancing contextual relevance and precision in data extraction.

The algorithm 118 may also cause the processor 104 to determine the contextual similarity between portions of text data, define chunk size and overlap parameters based on this similarity, and generate a set of preliminary text chunks accordingly. Chunk size may generally refer to the length or size of each individual text chunk created during the decomposition process, such as the number of characters, words, sentences, paragraphs, and/or other units of text that make up a single chunk. Larger chunk sizes may capture more content within a single chunk, while smaller chunk sizes focus on more granular or specific portions of the text data.

The overlap parameter(s) may determine the degree of overlap or common content shared between adjacent text chunks, thereby specifying the amount of content that is repeated or included in both the end of one chunk and the beginning of the next chunk. Overlapping chunks may help maintain continuity and coherence between adjacent text segments, ensuring a smoother transition and preserving the context of the content.

More generally, by adjusting chunk sizes and overlap parameters based on contextual similarity, the algorithm 118 may optimize the segmentation of text data to reflect the underlying relationships and coherence between text portions. Contextually related text portions may typically result in larger chunk sizes with minimal overlap to capture cohesive information, while contextually unrelated text portions may lead to smaller, distinct chunks with increased overlap to ensure a coherent separation of content. This nuanced approach may ensure that the resulting text chunks align with the natural flow and thematic integrity of the text data, enhancing the effectiveness and accuracy of the segmentation process.

As an example, consider a text file that needs to be segmented into text chunks by the processor 104 executing the smart chunking algorithm 118. Assume the text file include two text portions discussing "financial projections for Q3" and "actual performance in Q3", which are closely contextually related, sharing common themes, entities, and transitions in content. For these two contextually related text portions, the algorithm 118 may cause the processors 104 to assign larger chunk sizes (e.g., 100 words) to capture comprehensive information related to the same topic within a single chunk, and assign a smaller overlap parameter (e.g., 10 words) to preserve the specific details unique to each portion while ensuring a seamless transition between the chunks. Further assume that the text file includes two different text portions discussing "Q4 accounts receivable" and "upcoming marketing initiatives," which are contextually unrelated, covering distinct topics without significant overlap in content. In this scenario, the algorithm 118 may cause the processor 104 to assign smaller chunk sizes (e.g., twenty words) to isolate and differentiate the disparate content into separate chunks, and assign a larger overlap parameter (e.g., 50 words) to prevent abrupt transitions between the chunks, facilitating clarity in the segmentation process while maintaining readability.

Moreover, the algorithm 118 may cause the processor 104 to perform dynamic field grouping, adaptively process the chunked text, and intelligently reconstruct the text chunks. The algorithm 118 may cause the processor 104 to group extraction fields together based on overlapping document chunks (e.g., as defined by the overlap parameter and chunk size), streamlining processing and reducing redundancy by batch processing related fields that require shared text segments. Further, the algorithm 118 may cause the processor 104 to switch between chunked and full-file processing based on the availability of chunks for a field group. If there are an insufficient number of text chunks for a given field group (e.g., fail to satisfy the chunk threshold), the algorithm 118 may cause the processor to perform full-context extraction when necessary to ensure accuracy without compromising processing speed. The algorithm 118 may then cause the processor 104 to reassembles/reconstruct the retrieved text chunks into coherent, non-redundant segments for each field or field group (e.g., using the overlap detection and deduplication algorithm 142), ensuring the final extracted text is cohesive and accurate.

In certain embodiments, the algorithm 118 may cause the processor 104 to perform these field grouping, processing, and reconstruction processes by causing the processor 104 to assign up to each chunk a sequential identifier and based on the search outputs and associated metadata fields, group the preliminary text chunks into field groups, ensuring that each chunk is associated with the appropriate field. The algorithm 118 may then cause the processor 104 to determine whether a field group meets a chunk threshold. If the chunk threshold is met, the processor 104 may merge and refine the preliminary text chunks within the field group into a finalized text chunk, deduplicate redundant portions, reorder non-redundant content, and extract the cohesive text chunk. If the chunk threshold is not met, the processor 104 may combine chunks from different field groups (e.g., full-file processing), refine the combined text chunk following deduplication and reordering steps, and then extract the finalized text chunk.

The semantic clustering algorithm 120 is generally configured to cause the processor 104 to categorize embeddings into semantic clusters, facilitating the organization of textual data based on semantic meaning and contextual relationships. The algorithm 120 enhances data organization and facilitates semantic analysis by grouping embeddings into cohesive clusters that capture shared semantic properties and associations.

More specifically, the semantic clustering algorithm 120 may cluster the embeddings, which represent textual data in a numerical vector space, into semantic clusters based on their semantic similarity and associations. The semantic clustering process results in the creation of semantic clusters that encapsulate embeddings with similar semantic characteristics or meanings. Each semantic cluster may represent a distinct group of embeddings that are semantically related and share contextual proximity in the vector space.

In certain embodiments, the semantic clustering algorithm 120 may be or include the k-means clustering algorithm. When leveraging the k-means clustering algorithm, the embeddings may be partitioned into k clusters (where k is an integer value), where each cluster represents a group of embeddings sharing common semantic traits. The k-means clustering algorithm may generally assign embeddings to clusters iteratively by minimizing the sum of squared distances between data points and cluster centroids. By iteratively reassigning data points to clusters based on their proximity to cluster centers, k-means efficiently partitions embeddings into cohesive semantic clusters. Of course, the semantic clustering algorithm 120 may be or include any suitable clustering algorithm, such as hierarchical clustering, mean shift clustering, affinity propagation, spectral clustering, density-based spatial clustering of applications with noise (DBSCAN), and/or any other suitable algorithm or combinations thereof.

After clustering, the algorithm 120 may cause the processor 104 to conduct cluster analysis to evaluate the quality and coherence of the semantic clusters. The processor 104 may thereby assess the internal cohesion of each cluster and the separation between clusters to ensure meaningful and distinct groupings of embeddings based on their semantic relationships. This clustered representation may enable downstream applications to leverage the semantic clusters for tasks such as information retrieval, content recommendation, and semantic analysis based on clustered semantic similarities.

The language model 122 may generally be configured to cause the processor 104 to generate text or content based on a specific prompt or input. The language model 122 may cause the processor 104 to understand the input provided, process it, and then generate an output that corresponds to a specific file. The language model 122 may utilize ML techniques and algorithms to analyze the prompt or input text, extract relevant information, and then generate a comprehensive output that aligns with the desired file content. For example, this could involve tasks such as text completion, text generation, summarization, and/or even translation based on the given prompt. In certain embodiments, the language model 122 may be an LLM configured to receive data from the various algorithms and/or models described herein, as well as potentially input queries from a user (e.g., of the computing device 152 via the user interface 158), to generate outputs/responses that include some indication corresponding to the input file. For example, the language model 122 may generate an output indicating that a particular payment structure indicated in the input file includes multiple payment values/times and may recite such payment values/times as part of the output. It should be appreciated that the language model 122 may additionally or alternatively be stored/located outside of the computing system 102, such as on the external server 170 and/or any other suitable computing device(s), and that the application 112 may include instructions to transmit prompts to the model 122 across the network 180 via the networking interface 110.

The visualization algorithm 124 is generally configured to cause the processor 104 to transform complex data about semantic and structural clusters into a visually engaging and informative feature visualization that highlights their relationships through a cross-tabulation heatmap (e.g., determined by the projection algorithm 136). The visualization algorithm 124 may cause the processor 104 to process the data related to the semantic and structural clusters to generate the feature visualization indicating the cross-tabulation heatmap, which may generally represent calculated similarities, distances, and/or other relevant metrics between data points within the clusters. The feature visualization may involve overlaying the heatmap data on a visual representation of the clusters, such as a scatter plot, network graph, and/or other graphical layout to provide a comprehensive view of the cluster relationships in a more intuitive and understandable format.

The structural clustering algorithm 126 may generally be configured to group text chunks into cohesive structural clusters and may be or include the set of regex-based instructions 128, the set of rule-based instructions 130, the spectral clustering recognition algorithm 132, and/or the affinity propagation pattern recognition algorithm 134. In certain embodiments, the algorithm 126 may be or include a hierarchical DBSCAN algorithm and/or other suitable density-based clustering algorithm(s) configured to group the text chunks into initial clusters based on their spatial density distribution. DBSCAN may be particularly adept at clustering data points based on their density rather than predefined clusters, which may be advantageous for clustering text chunks based on structural features by allowing for flexible, noise-resistant, and adaptive clustering that accurately captures the diverse and complex structural patterns present in text data.

Text data often exhibits complex and irregular structural patterns that may not conform to predefined cluster shapes or sizes. DBSCAN's density-based approach allows it to detect clusters of varying shapes and sizes, making it well-suited for capturing the diverse structural features present in text chunks. Moreover, text data frequently contains noise or outliers, such as punctuation marks, formatting inconsistencies, and/or extraneous characters, which can disrupt traditional clustering algorithms. DBSCAN's noise tolerance and ability to identify core samples surrounded by lower-density regions make it generally resilient to noise and ensure that structural clustering focuses on meaningful patterns rather than noise elements.

Additionally, the algorithm 126 employing DBSCAN may help automatically identify clusters based on the density of data points, without requiring prior assumptions about the number of clusters in the data. This property is advantageous when clustering text chunks with varying structural complexities, as DBSCAN can adapt to the inherent density fluctuations in the data and generate clusters based on the local density of text features. Text data also often contains both sparse regions (e.g., paragraphs with fewer structural elements) and densely packed regions (e.g., tables or lists with intricate structures). The algorithm 126 may effectively differentiate between regions of varying density by leveraging DBSCAN to effectively cluster text chunks, ensuring that both sparse and densely packed structural features are appropriately grouped together. Collectively, the structural clustering algorithm 126 may utilize the DBSCAN framework to achieve significant computational efficiency and scalability by focusing on the density distribution of data points (e.g., text chunks/data) and thereby processing large volumes of text data without sacrificing clustering performance.

However, the algorithm 126 may also employ a combination of other algorithms/instructions 128-134. For example, the algorithm 126 may cause the processor 104 to execute the regex-based instructions 128 and the rule-based instructions 130 to identify common clause structures, keywords, and/or formatting patterns within the text chunks. Causing the processor 104 to execute these instructions 128, 130 may extract meaningful structural features from the text chunk data and may more generally ensure that files exhibiting specific structural markers are accurately assigned to predefined categories, thereby enhancing the precision of the clustering process.

The set of regex-based instructions 128 may generally involve defining patterns using regular expressions to match specific text sequences or structures within the files. For instance, regex patterns may be created to identify common clause structures such as "Terms and Conditions," "Indemnification Clause," or "Payment Terms." The set of regex-based instructions 128 may further specify keywords relevant to file categories, like "Agreement," "Service Level Agreement (SLA)," or "Non-Disclosure Agreement (NDA)." Additionally, the set of regex-based instructions 128 may enable capturing formatting patterns, such as consistent use of section numbering, indentation, and/or bold text for use in clustering files based on structural similarities.

The set of rule-based instructions 130 may involve the application of logical conditions or criteria to identify structural markers within the files. The rules included as part of the set of rule-based instructions 130 may be defined based on context-specific knowledge or domain expertise. For example, a rule in the instructions 130 may stipulate that if a file contains a specific set of clauses or keywords, it should be categorized as a certain type of contract (e.g., a Services Agreement or a License Agreement). Rules included as part of the instructions 130 may also be set to detect the presence of formatting styles or document structures that signify a specific contract category. For instance, if a file consistently uses tables for pricing information, the instructions 130 may include a rule to classify the file as a pricing agreement.

Thus, collectively, the instructions 128 and 130 may be applied by the processor 104 to scan the text chunks comprising a file for common clause structures, keywords, and formatting patterns, such that the processor 104 may identify other text chunks (e.g., other files) that match these pre-defined patterns and mark them as potential indicators of contract types or categories. The processor 104 may then assign files containing specific structural markers identified through the regex-based and rule-based heuristics instructions 128 and 130 to structural clusters based on these detected patterns. Namely, files that exhibit similar clause structures, keywords, and/or formatting characteristics may be clustered together in a corresponding structural cluster. This clustering process organizes files with similar file structures and content into coherent groups, allowing for efficient management, retrieval, and analysis of files.

In certain embodiments, the structural clustering algorithm 126 may utilize one or more pattern recognition algorithms, such as the spectral clustering pattern recognition algorithm 132 and/or the affinity propagation pattern recognition algorithm 134. The spectral clustering pattern recognition algorithm 132 may identify clusters within the set of initial structural clusters and/or may cluster text from the file based on the file structure instead of textual similarities. The affinity propagation pattern recognition algorithm 134 may generally consider/evaluate formatting features of the data to determine the appropriate number of clusters and assign data points (e.g., files, text chunks) to these clusters. Spectral clustering is effective at discovering clusters by exploring the relationships between data points in a high-dimensional space.

The spectral clustering pattern recognition algorithm 132 may generally cause the processor 104 to cluster data points based on their relationships in a high-dimensional space. When applied to cluster a set of text chunks from a file (e.g., representing the complete file text) the spectral clustering pattern recognition algorithm 132 may cluster the text chunks, and by extension the file, based on document structure rather than text similarity. The algorithm 132 may first construct a similarity graph where each node represents a text chunk from the file. The similarity between text chunks may be calculated based on their structural features rather than just text content. Such structural features may include hierarchical organization, section headings, sections/subsections themselves, formatting patterns, and/or sentence arrangement.

The algorithm 132 may then include determining a graph Laplacian matrix, which may capture the relationships between nodes in the similarity graph by encoding the structural similarities between text chunks according to the defined criteria of document structure. This algorithm 132 may also perform eigenvalue decomposition of the Laplacian matrix to obtain the eigenvectors and eigenvalues. By analyzing the eigenvectors associated with the smallest eigenvalues, the algorithm 132 may identify the optimal embedding of the data points in a lower-dimensional space that preserves the structural relationships between text chunks.

After obtaining the eigenvectors, the algorithm 132 may apply a clustering algorithm (e.g., k-means) to the eigenspace to partition the text chunks into distinct clusters based on their structural similarities. This clustering in the eigenspace may allow for grouping files that exhibit similar structural features, enabling the algorithm 132 to identify clusters based on the file structure rather than text similarity alone. The algorithm 132 may thereafter assign the set of text chunks to a structural cluster based on the clustering results in the eigenspace. Sets of text chunks belonging to the same cluster may be deemed to share similar structural patterns, indicating that they are likely to be related in terms of file structure.

The affinity propagation pattern recognition algorithm 134 may generally cause the processor 104 to cluster data points based on shared formatting features such as table structures, section headings, and/or metadata organization. The algorithm 134 may include computing a similarity matrix that quantifies the similarity between pairs of files based on their shared formatting features. The algorithm 134 may cause the processor 104 to compare features like table structures, section headings, and/or metadata organization across all files to create this similarity matrix. Affinity propagation may generally require the algorithm 134 causing the processor 104 to set/establish preference values for each file, indicating the initial attractiveness of each file to serve as an exemplar. These preference values may influence the likelihood of a file becoming an exemplar, emphasizing certain files over others based on their structural characteristics.

The algorithm 134 may then iterate through a message-passing process, during which each data point (e.g., file) may exchange information with up to all other data points to update their beliefs about cluster assignments. The messages exchanged reflect both the shared formatting features between files and the preferences previously established by the algorithm 134. As the iterations progress, the algorithm 134 may cause the processor 104 to gradually determine exemplars by evaluating the combined influence of shared formatting features and preferences. Files with strong structural similarities, such as matching table structures or section headings, are more likely to be selected as exemplars.

Once the exemplars are identified, the algorithm 134 may cause the processor 104 to assign up to each file to the nearest exemplar based on the accumulated messages and similarity metrics. Files with similar formatting features may be grouped together within clusters centered around their respective exemplars. The algorithm 134 may cause the processor 104 to iteratively perform this clustering process to ensure that files with consistent formatting features, such as coherent table structures and/or metadata organization, are accurately grouped together. Through each iteration, the algorithm 134 may cause the processor 104 to continuously refine the cluster assignments based on the shared formatting characteristics of the files.

In certain embodiments, the structural clustering algorithm 126 may combine the outputs of multiple of the algorithms/instructions 128-134 and/or the DBSCAN outputs, as described herein. By combining the results from DBSCAN, the regex-based instructions 128, the rules-based instructions 130, the spectral clustering pattern recognition algorithm 132, and/or the affinity propagation pattern recognition algorithm 134, the algorithm 126 may achieve a comprehensive structural clustering of the file and/or text chunks.

For example, the structural clustering algorithm 126 may cause the processor 104 to execute up to each of the individual instructions/algorithms 128-134 in parallel (or in sequence) to generate cluster outputs representing clusters of files based on, e.g., density clustering, structural markers, document structure, and/or formatting characteristics. The algorithm 126 may cause the processor 104 to then merge the outputs from DBSCAN, the regex-based instructions 128, the rule-based instructions 130, the spectral clustering pattern recognition algorithm 132, and/or the affinity propagation pattern recognition algorithm 134 through a merging mechanism. In certain embodiments, the merging mechanism may be or include weighted fusion (e.g., weighting outputs based on their reliability, relevance, or performance), averaging, weighted averaging, decision rule(s), thresholding, filtering, consensus building, and/or any other suitable technique or combinations thereof. By amalgamating the outputs from multiple algorithms and instructions, the structural clustering algorithm 126 may cause the processor 104 to holistically assess the structural attributes of the file (e.g., via the set of text chunks). This comprehensive approach ensures that the clustering process captures a wide range of structural features, including density distribution, clause structures, keywords, document structure, and formatting patterns.

The projection algorithm 136 may generally determine a 2D projection and a cross-tabulation heatmap associated with the semantic clusters and the structural clusters output by the semantic clustering algorithm 120 and the structural clustering algorithm 126, respectively. More specifically, the projection algorithm 136 may cause the processor 104 to evaluate the data points comprising a semantic cluster (based on semantic content similarity) and a structural cluster (based on structural features). In certain embodiments, the algorithm 136 may cause the processor 104 to apply dimensionality reduction techniques (e.g., Principal Component Analysis (PCA) or t-Distributed Stochastic Neighbor Embedding (t-SNE)) to reduce the high-dimensional data from the semantic and structural clusters to a 2D space while preserving the relationships between the data points. The algorithm 136 may further cause the processor 104 to generates a scatter plot where each point represents a data point from the semantic and structural clusters in the 2D projection space, where closer points in the plot may indicate higher similarity or proximity between the data points in the original high-dimensional space.

Subsequently, the projection algorithm 136 may cause the processor 104 to construct a similarity matrix between the semantic cluster and the structural cluster based on their respective features or characteristics. The similarity values may represent how closely related or similar the clusters are based on the defined metrics. With the similarity matrix, the algorithm 136 may cause the processor 104 to generate a cross-tabulation heatmap where the rows and columns may correspond to the semantic and structural clusters and the cells of the heatmap may display the similarity values, with higher values indicating greater similarity between the clusters. In certain embodiments, the projection algorithm 136 may cause the processor 104 to render the heatmap (e.g., for display via a display of the I/O interface 108) using a color gradient scale, where contrasting colors (e.g., from green to red) may signify varying degrees of similarity. This visual representation may highlight patterns of similarity or dissimilarity between the semantic and structural clusters.

Based on the features indicated in the 2D projection scatter plot and cross-tabulation heatmap, the projection algorithm 136 may further cause the processor 104 to determine certain insights associated with the relationships between the semantic and structural clusters. For example, regions within the plot and/or heatmap indicating patterns of alignment, overlap, and/or divergence in the clusters may generally represent the interplay between semantic content and structural features in the data. More specifically, the combined analysis of the projection scatter plot and heatmap may enable the processor 104 to determine insights regarding the relationships, similarities, and/or differences between the semantic and structural aspects of the clusters. The prompt optimization algorithm 138 may generally cause the processor 104 to leverage ontology-based insights, adapt prompts based on file types/classes, and utilize learning techniques to dynamically generate context-aware prompts aligned with the domain-specific terminology in various files, enabling precise and relevant AI responses tailored to the nuances of file types/classes and structures. For example, the algorithm 138 may cause the processor 104 to leverage ontology-based knowledge and/or file-specific domain understanding (e.g., that may be stored in the application data 146) to dynamically construct prompts aligned with domain-specific terminologies and context from the extracted textual data.

In certain embodiments, the prompt optimization algorithm 138 may cause the processor 104 to incorporate the file class information output by the classification algorithm 144 (e.g., professional, ancillary, facility files) to tailor prompts based on the specific domain or file class under analysis. With this information, the algorithm 138 may cause the processor 104 to generate context-aware prompts to guide the language model's 122 responses by capturing the distinctive characteristics of the files and the associated concepts within the domain. The algorithm 138 may further cause the processor 104 to customize prompts in real-time based on the file class identified (e.g., professional, ancillary, facility) to ensure relevancy and accuracy in the AI-generated responses.

As an example, the algorithm 138 may train and/or otherwise inform the language model's 122 output through few-shot and/or multi-shot learning techniques. The algorithm 138 may cause the processor 104 to employ few-shot learning techniques to adapt prompts for different file scenarios, allowing the model 122 to learn from limited examples and fine-tune the prompt generation process. Similarly, the algorithm 138 may cause the processor 104 to implement multi-shot prompting strategies where the algorithm 138 may cause the processor 104 iteratively refine prompts and responses through sequential interactions with the language model 122, thereby enhancing prompt generation precision and refining the understanding of complex file nuances.

As part of this iterative improvement process, the algorithm 138 may cause the processor 104 to evaluate the generated prompts using quality metrics to assess coherence, relevance, and/or effectiveness in steering the language model's 122 outputs. With these quality metrics, the algorithm 138 may cause the processor 104 to iteratively refine prompt generation strategies (e.g., adaptive prompt expansion, dynamic contextual prompts, adversarial prompt evaluation, prompt diversity enhancement) and may further incorporate user feedback and/or evolving file requirements. Overall, the algorithm 138 may cause the processor 104 to continuously improve the prompt optimization process by leveraging prior step results and utilizing few-shot/multi-shot prompting to enhance response/output generation accuracy and domain-specific understanding.

The real-time tracking and self-repair algorithm 140 may generally identify and rectify process failures or incompletions, adjusting parameters adaptively based on process attributions, and continuously monitor system performance to maintain the operational robustness and efficiency of the workflow. The algorithm 140 may cause the processor 104 to monitor various stages in the various workflows described herein, such as extraction, conversion, decomposition, clustering, and/or generation for potential process failures or incompletions. Upon detecting a failed process (e.g., extraction error or clustering failure) or an incomplete process (e.g., partial data conversion), the algorithm 140 may cause the processor 104 to resolve the issue and/or flag the issue for resolution, such as by one or more of the components described herein.

To facilitate this tracking and repair process, the algorithm 140 may cause the processor 104 to determine the source of a process incompletion/failure. For example, the algorithm 140 may cause the processor 104 to determine whether the failed or incomplete process is linked to the current ongoing process or stems from a preceding operation in the workflow. By analyzing the process dependencies and sequence, the algorithm 140 establishes the relationship between the detected issue and the corresponding process stage. If the failed or incomplete process is associated with the current ongoing operation, the algorithm 140 may cause the processor 104 to dynamically adjust the parameters of the current process to address the identified issue in real-time. If the issue relates to a prior process, the real-time tracking and self-repair algorithm 140 may cause the processor 104 to modify the parameters of the affected process, from the past or current workflow stages, to rectify the underlying cause of the failure or incomplete execution. Causing the processor 104 to adapt parameters based on the assessment outcome may repair (e.g., self-repair) the defective or incomplete process, aiming to resume and complete the workflow seamlessly.

Moreover, the real-time tracking and self-repair algorithm 140 may cause the processor 104 to continuously monitor the various processes described herein (e.g., in relation to the various algorithms/models) for process anomalies and deviations, intervening promptly to troubleshoot and resolve issues. Leveraging ML or AI techniques, the algorithm 140 may cause the processor 104 to learn from historical process failures and adjustments, refining its self-repair strategies for enhanced efficiency and effectiveness over time. Through iterative improvements and adaptive parameter tuning, the algorithm 140 may cause the processor 104 to optimize process performance, minimize downtime, and maintain the overall operational integrity of the system.

The algorithm 140 may further cause the processor 104 to provide feedback loops to track the outcomes of parameter adjustments and self-repair actions, ensuring that the corrective measures are effective in restoring process functionality. Comprehensive reporting functionalities enable the application 112 to review process failures, resolutions, and/or performance enhancements implemented by the real-time tracking and self-repair algorithm 140, supporting transparency and accountability in system maintenance and optimization.

The overlap detection and deduplication algorithm 142 may generally cause the processor 104 to detect and deduplicate redundant portions within text data to streamline information, improve data consistency, and enhance the quality of text processing tasks. The algorithm 142 may cause the processor 104 to break down the text chunks into smaller segments and/or tokens for analysis. The algorithm 142 may cause the processor 104 to apply text preprocessing techniques such as tokenization, stemming, and/or normalization to standardize the text data for comparison. The algorithm 142 may then cause the processor 104 to compare each segment of the text chunk to detect overlapping or repeated portions within the chunk. For example, the algorithm 142 may cause the processor 104 to utilize similarity metrics, such as cosine similarity or Levenshtein distance, to identify sections of text that exhibit high similarity or redundancy.

With the similar/redundant text portions identified, the algorithm 142 may cause the processor 104 to flag the redundant portions for deduplication. The algorithm 142 may cause the processor 104 to determine the most appropriate strategy for deduplication, such as retaining the unique instance of a segment or merging redundant portions into a single representation. The algorithm 142 may then cause the processor 104 to remove or consolidate duplicated or overlapped portions within the text chunk based on the deduplication strategy and generate an output that reflects the deduplicated version of the text chunk, ensuring that redundant information is eliminated or consolidated for improved data quality.

The classification algorithm 144 may generally cause the processor 104 to systematically process extracted textual data, extract/determine relevant features, train a classification model based on predefined categorization criteria, and/or accurately determine a file class (e.g., Standard, Complex) for each file, enabling effective pre-processing and segmentation of files. The algorithm 144 may cause the processor 104 to extract relevant textual data from the file, such as clauses, terms, metadata, and/or table structures. The algorithm 144 may then cause the processor 104 to apply text preprocessing techniques to clean and prepare the extracted data for classification, ensuring consistency and standardization. As a result, the algorithm 144 may cause the processor 104 to identify relevant features from the text data that are indicative of file complexity, such as the total number of pages and the presence of tables within the file.

With this information, the algorithm 144 may further cause the processor 104 to utilize feature engineering techniques to transform raw text data into numerical or categorical features that the classification algorithm 144 may utilize for decision-making. The classification algorithm 144 may be trained, e.g., on a labeled dataset that includes files categorized as Standard or Complex based on the defined criteria. For example, the processor 104 may utilize one or more ML algorithms/techniques, such as logistic regression, decision trees, and/or support vector machines to serve as part of the classification algorithm 144 for such classification tasks. The processor 104 may further evaluate the trained classification model 144 using validation techniques such as cross-validation or holdout validation to assess its performance in distinguishing, e.g., between Standard and Complex files. The processor 104 may utilize performance metrics such as accuracy, precision, recall, and/or F1 score to measure the model's 144 effectiveness in classifying files.

Regardless, the classification algorithm 144 may cause the processor 104 to analyze a new file and predict the file class (e.g., Standard vs Complex) based on the specific features extracted from the text data. The algorithm 144 may cause the processor 104 to use the defined threshold(s) (e.g., the number of pages and/or presence of tables) to make the classification decision. The algorithm 144 may cause the processor 104 to assign the appropriate file class to the file based on the classification result and may further cause the processor 104 to analyze and interpret the classification outcome to provide insights into the complexity level of the file, aiding in subsequent processing and decision-making.

More generally, the computing device 152 may be or include any one or more devices that is associated with (e.g., owned and/or operated by) one or more entities (e.g., a file owner) that may provide data (e.g., file data 162) that is transmitted to and/or is otherwise accessible by the computing system 102 and/or the external server 170 through the network 180. In some embodiments, the computing system 102 and/or the computing device 152 is a server or collection of servers hosting the file data 162, the application data 146, or a portion thereof. However, in certain embodiments, the computing device 152 is a personal computing device of that entity/user, such as a smartphone, a tablet, smart glasses, or any other suitable device or combination of devices (e.g., a smart watch plus a smartphone) with wireless communication capability.

The computing device 152 may be communicatively coupled to the computing system 102 and/or the external server 170. For example, the computing device 152, the computing system 102, and/or the external server 170 may communicate via USB, Bluetooth, Wi-Fi Direct, Near Field Communication (NFC), a private or public network (e.g., via an Internet protocol, such as IPv4, via a virtual private network (VPN)), etc. For example, the computing system 102 may transmit a response generated by the language model 122, a portion of the application data 146, and/or any other data to the computing device 152 via the networking interface 110, which the computing device 152 may receive via the networking interface 160.

The external server 170 may be or include computing servers and/or combinations of multiple servers storing data that may be accessed/retrieved by the computing system 102 and/or the computing device 152. In certain embodiments, the external server 170 receives data from the computing system 102 and/or the computing device 152 and retrieves/accesses information stored in memory (not shown) for transmission back to the computing system 102 and/or the computing device 152. It should be appreciated that the external server 170 can include one or multiple computing devices that are co-located or distributed.

Further, in certain embodiments, the external server 170 may include a set of application data 172 including data from one or both of the computing device 152 and/or the computing system 102. In one such example, the external server 170 may be a server located in and/or otherwise associated with an entity that generates responses to use queries regarding input files, and the application data 172 includes prior responses to queries similar to a recently received query from the computing device 152. As another example, the external server 170 may serve as a database for some/all of the application data 146. In some embodiments, the example computing system 100 does not include the external server 170.

Each of the processors 104, 154 may include any suitable number of processors and/or processor types. For example, the processors 104, 154 may each include one or more CPUs and one or more graphics processing units (GPUs). Generally, each of the processors 104, 154 may be configured to execute software instructions stored in each of the corresponding memories 106, 156. The memories 106, 156 may each include one or more persistent memories (e.g., a hard drive and/or solid-state memory) and may store one or more applications, modules, and/or models, such as the file processing application 112.

The networking interface 110 may enable the computing system 102 to communicate with the computing device 152, the external server 170, and/or any other suitable devices or combinations thereof. More specifically, the networking interface 110 may enable the computing system 102 to communicate with each component of the example computing system 100 across the network 180 through their respective networking interfaces (e.g., 160). The networking interfaces 110, 160 may support one or more of the communication/network protocols implemented by the network 180. The networking interface 110 may enable the computing system 102 to communicate with the various components of the example computing system 100 via a wireless communication network such as a fifth-, fourth-, or third-generation cellular network (5G, 4G, or 3G, respectively), a Wi-Fi network (802.11 standards), a WiMAX network, or any other suitable wide area network (WAN), local area network (LAN), or personal area network (PAN), etc.

Moreover, the network 180 may be a single communication network, or may include multiple communication networks of one or more types (e.g., one or more wired and/or PANs or LANs, and/or one or more WANs such as the Internet). In some embodiments, the network 180 includes multiple, entirely distinct networks (e.g., one or more networks for communications between computing system 102 and computing device 152, and a separate, Bluetooth or wireless LAN (WLAN) network for communications between computing system 102 and the external server 170, and so on).

It will be understood that the above disclosure is one example and does not necessarily describe every possible embodiment. As such, it will be further understood that alternate embodiments may include fewer, alternate, and/or additional steps or elements.

Figure 2A:
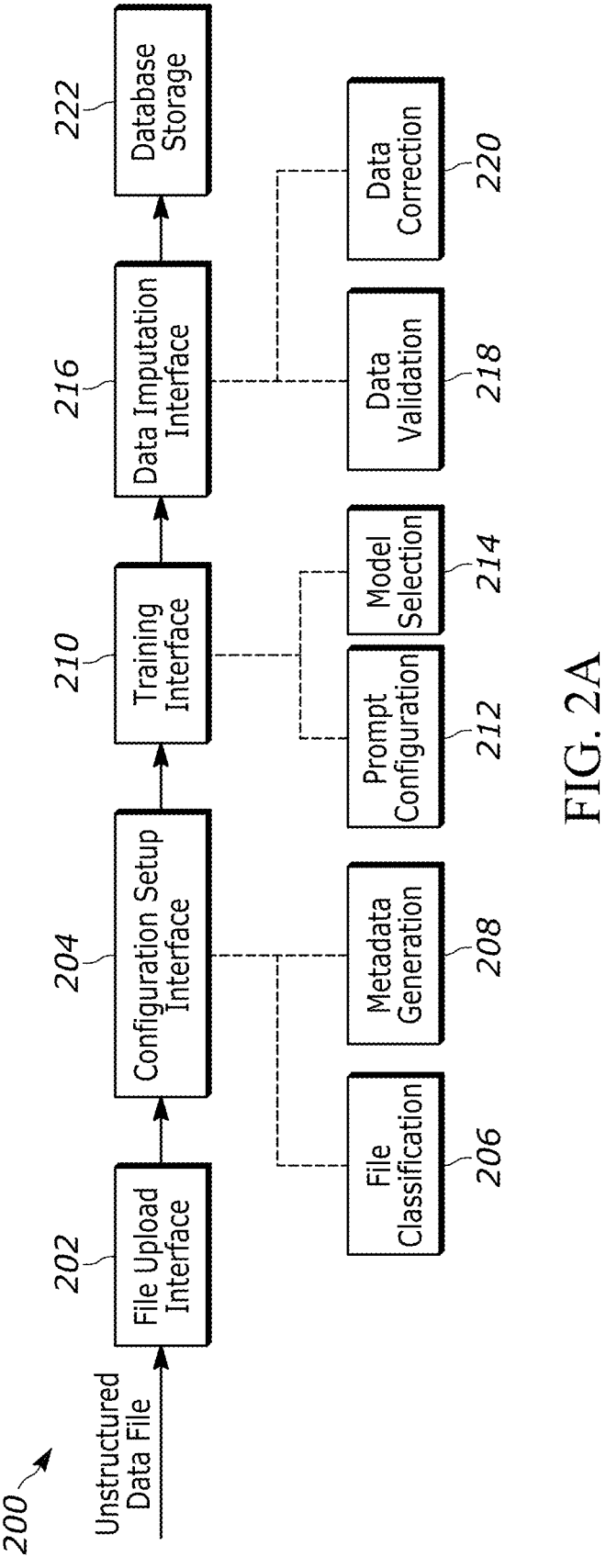
FIG. 2A is a first architectural diagram, in accordance with various embodiments described herein.

FIG. 2A is a first architectural diagram 200, in accordance with various embodiments described herein. The first architectural diagram 200 includes a set of interfaces that generally represent one or more functions being performed with respect to the input data. In particular, the interfaces described herein may comprise a modular architecture for conceptualizing a collection of functions that work together to achieve a specific set of tasks within a computing system (e.g., example system 100, computing system 102). Each interface may generally define a boundary or layer through which various functionalities related to data ingestion, file profiling/classification, data extraction, data validation/correction, and/or data storage may be accessed and utilized. These interfaces may serve as a standardized way for other components or services to interact with the functions they encapsulate. These functions may be or comprise those described herein (e.g., facilitated by the file processing application 112), such as those functions performed by the various algorithms/models described herein (e.g., extraction algorithm 114, prompt optimization algorithm 138). For example, at least a portion of the functions described in reference to FIG. 2A may be performed utilizing scalable and versatile technologies such as an external processing service (e.g., AWS Lambda), a cloud-based database (e.g., Snowflake), and/or an advanced data processing tool (e.g., AWS Bedrock).

Thus, as referenced herein, the term "interface" may generally indicate how these different services or components interact with each other. For example, the file upload interface 202 and the configuration setup interface 204 may represent a higher-level abstraction for the underlying components (e.g., applications, algorithms, models, etc.) to seamlessly work together in a cohesive workflow. At least in this sense, the interfaces described in reference to FIG. 2A may represent a separation of concerns and modularity in software design, where specific functionalities are encapsulated within well-defined units that may be easily swapped or upgraded without impacting the overall system structure. In certain instances, the term "interface" may be or include, e.g., an application programming interface (API), which may define the methods and protocols through which different software components can communicate and interact with each other to achieve the outputs described herein.

The first architectural diagram 200 includes an unstructured data file being input into a file upload interface 202. This interface 202 may function as a gateway for ingesting unstructured data files into the system, such as by receiving the data files and handling the initial steps of processing and storing them for further manipulation and analysis. Thus, the file upload interface 202 may manage the initial processing and storage steps necessary for the subsequent stages of data manipulation. Once the data files are ingested and stored through the file upload interface 202, the files may be seamlessly accessed by downstream processes, such as the other interfaces described herein.

As part of this data ingestion process, the file upload interface 202 may leverage existing storage systems or network drives for receiving and managing the incoming data files. These drives may act as a repository for storing the files temporarily before they are processed further. For example, the interface 202 may include and/or otherwise utilize a storage solution component, (e.g., local memory and/or external storage service) to serve as a permanent file store where the processed and ingested data files may be stored securely. Further, the interface 202 may also include and/or otherwise utilize a compute service (e.g., external processing service or local processor(s)) for handling the data upload process within the interface 202. For example, when leveraging an external processing service, the interface 202 may trigger the service to perform actions such as processing the uploaded data, validating it, and/or triggering subsequent steps in the workflow of the diagram 200.

The first architectural diagram 200 further includes the pre-processed data file being input into a configuration setup interface 204 from the file upload interface 202. The configuration setup interface 204 may generally be responsible for performing file classification 206 and metadata generation 208 tasks on the received pre-processed data files received from the file upload interface 202. By structuring the workflow through the configuration setup interface 204 and incorporating specific tasks such as file classification 206 and metadata generation 208, the workflow illustrated in the diagram 200 may streamline the data preparation process, making it easier for the underlying computing systems to accurately derive patterns and/or other features from the data during/for downstream applications.

More specifically, the file classification 206 process within the configuration setup interface 204 may involve classifying and/or organizing the data files based on various criteria, as described herein. This may include assigning labels, tags, and/or classes to the files to facilitate easy retrieval and management. The output of this process may be or include structured file directories, tags attached to files, and/or metadata attributes indicating the file types. In particular, the metadata may be generated/extracted as a result of the metadata generation 208 performed as part of the configuration setup interface 204. This metadata generation 208 process may be or include extracting relevant information from the data files to create descriptive metadata. The metadata may include details such as file name, size, format, creation date, author, and/or any other pertinent information related to the content of the files, as further described herein. The interface 204 may utilize a local software package and/or an external extraction service (e.g., Amazon Textract) that is configured to extract text, key-value pairs, and/or tables from the files to enrich the metadata with structured features while preserving the formatting of the file.

The first architectural diagram 200 further includes the outputs from the configuration setup interface 204 and the pre-processed file being input into a training interface 210. The training interface 210 may generally be responsible for prompt configuration 212 and model selection 214 tasks as part of a broader category of data extraction performed as part of the workflow represented by the diagram 200. In the context of the system architecture represented by the diagram 200, the training interface 210 may focus on fine-tuning the utilized AL/ML models and configurations necessary for effective data extraction.

The prompt configuration 212 performed as part of the training interface 210 may involve setting up the appropriate prompts or queries that will be used to guide the data extraction process. These prompts may define the specific information or context that the model should focus on during the extraction phase. Thus, the output of this prompt configuration 212 may be or include a set of structured prompts tailored to the data at hand, ensuring accurate and relevant data extraction. Further, the model selection 214 performed as part of the training interface 210 may include choosing a suitable AI/ML model (e.g., a pre-configured generative pre-trained transformer (GPT)) model to receive the structured prompts and execute the data extraction process. This may involve assessing the characteristics of the data, the complexity of the extraction task, and/or the desired outcomes to select the optimal model.

The first architectural diagram 200 further includes the outputs from the training interface 210 being input into data imputation interface 216, which may generally be responsible for data validation 218 and data correction 220 tasks. By incorporating the data validation 218 and data correction 220 functionalities in the data imputation interface 216, the system at least partially represented by the diagram 200 may maintain data quality and consistency, ensuring that the processed data is accurate and reliable for downstream analysis.

The data validation 218 performed as part of the data imputation interface 216 may involve assessing the accuracy, completeness, and/or conformity of the data against certain validation rules. This validation process may ensure that the data meets the specified criteria and standards set for analysis, and these validation checks may be or include verifying data types, ranges, relationships, and/or any other constraints associated with data integrity. If any of the data is determined to be inaccurate during execution of the data validation 218, the data correction 220 within the data imputation interface 216 may rectify such inaccuracies or inconsistencies. This may involve, e.g., manipulating, transforming, and/or updating the data to adhere to the defined standards and rectify any identified errors.

As an example of the functions performed as part of the data imputation interface 216, suppose the training interface 210 outputs a dataset with missing values in certain columns. The data imputation interface 216 may validate this dataset (e.g., via block 218) against predefined rules, such as ensuring that all required fields are populated and the values fall within acceptable ranges. In the case of missing or incorrect values, the interface 216 may correct them (e.g., via block 220) by imputing suitable values based on the existing data patterns or rules specified in the validation process.

The first architectural diagram 200 further includes the outputs from the data imputation interface 216 being stored in database storage 222, which may generally store any/all data input and/or output as a part of the workflow depicted by the first architectural diagram 200. As mentioned, the database underlying the database storage 222 may be a local storage solution (e.g., application data 146) and/or may include an external storage solution (e.g., external server 170), which may include cloud-based storage.

Figure 2B:
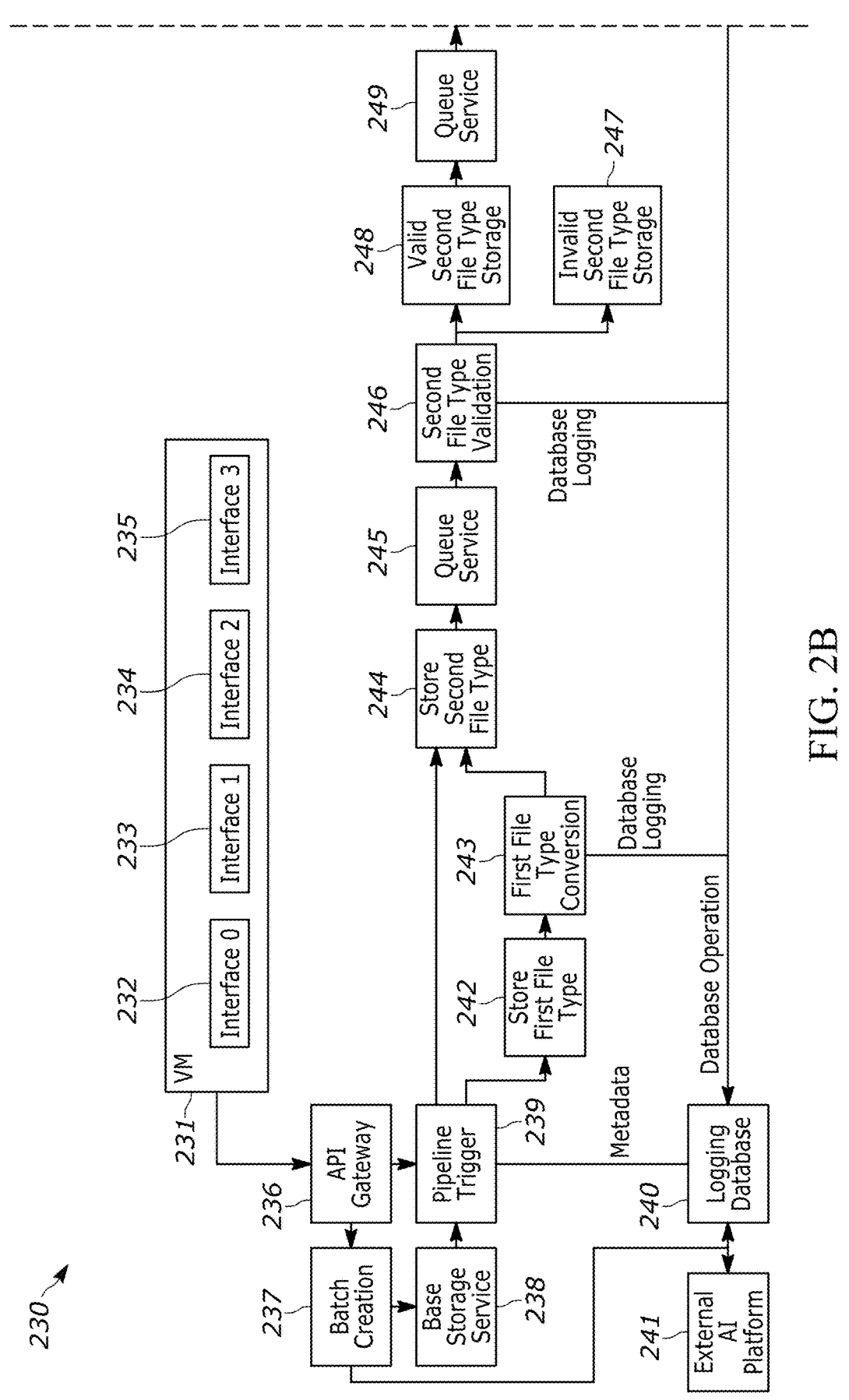
FIG. 2B is a second architectural diagram corresponding to the first architectural diagram of FIG. 2A, in accordance with various embodiments described herein.
Figure 2B:
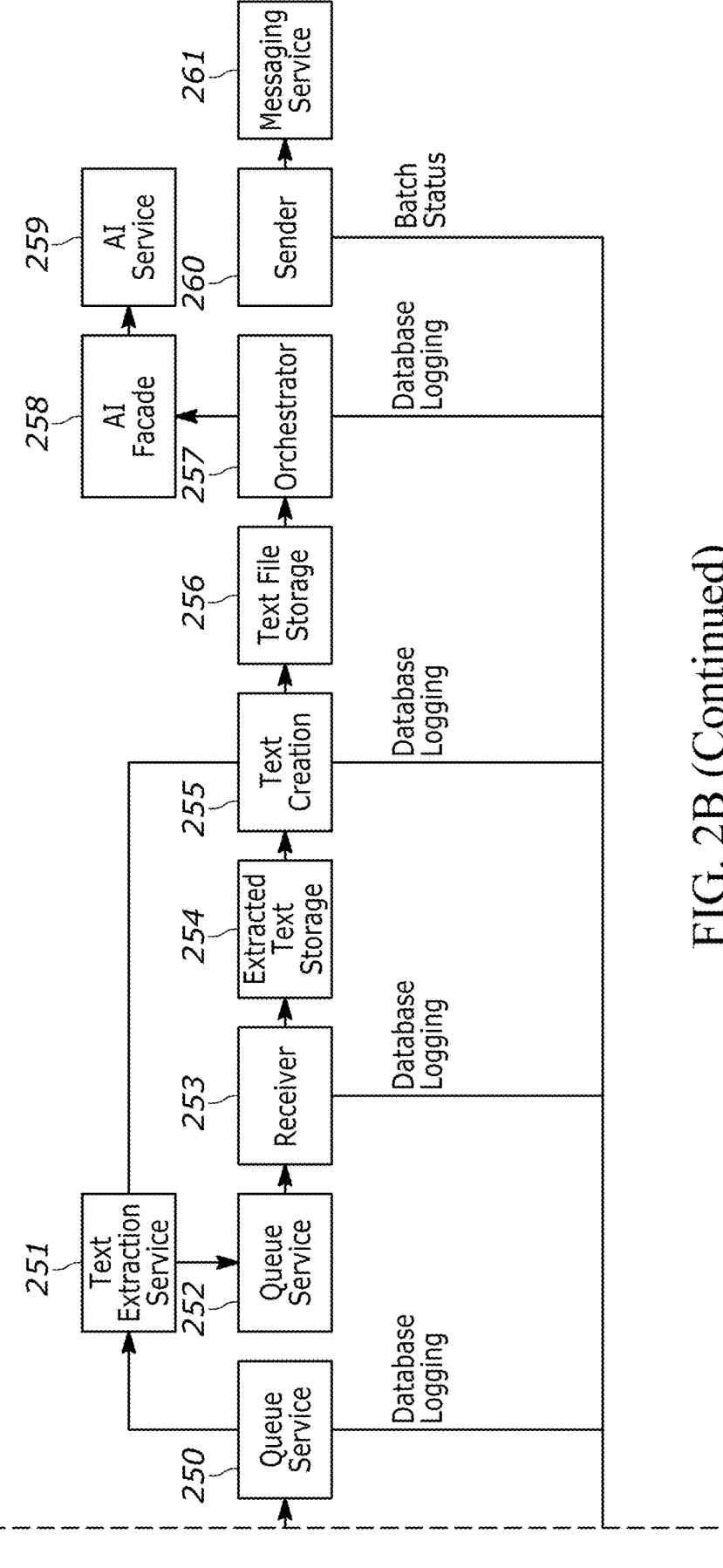

FIG. 2B is a second architectural diagram 230 corresponding to the first architectural diagram of FIG. 2A, in accordance with various embodiments described herein. This diagram 230 may depict some of the workflow/functions generally described in reference to the first architectural diagram 200 of FIG. 2A. The second architectural diagram 230 may include a virtual machine (VM) 231 that may generally comprise four interfaces 232, 233, 234, and 235, which may generally reference or represent the interfaces described in reference to FIG. 2A.

As part of executing the functions associated with each/any of the interfaces 232-235, the VM 231 may transmit signals through an API gateway 236 that may be configured to route incoming requests for batch creation 237 to the appropriate backend services or functions responsible for processing the batch tasks. For example, the batch creation 237 may include transmitting a batch identification (ID) to an external AI platform 241 for reference or further processing functions. This batch creation 237 request may be further transmitted to a base storage service 238 which may store the request and forward the request as a pipeline trigger 239 to initiate various functions. The API gateway 236 may also forward such a pipeline trigger 239 based on the information/data received from the VM 231. The metadata from and/or otherwise associated with the pipeline trigger 239 may be stored in a logging database 240. In certain embodiments, the pipeline trigger 239 may be or include a file and/or data associated therewith to be processed.

In response to the trigger 239, the workflow may proceed to store file data associated with the trigger 239, and this data may be in a first file type 242 (e.g., a non-PDF file). The workflow may further include converting the first file to a second file type 243 to standardize the processing performed therein. For example, the first file type may be a non-PDF file type (e.g., a XLS file, a JPG file, a TXT file, etc.), and the components described herein may convert the first file from the first file type to the second file type (e.g., PDF) using a converter. Once converted, the first file may be stored in the second file type 244, and a record of the successful conversion may be stored in the logging database 240. Alternatively, if the systems described herein determine that the first file is already in the standardized file type, the trigger 239 may transition directly to storing the first file in the second file type 244.

Regardless, once stored in the second file type 244, the systems described herein may utilize a queue service 245 to manage the subsequent queue of tasks/functions, ensuring that each task/function is processed in the intended order. For example, the tasks/functions may be stored by the queue service 245 in a first-in, first-out (FIFO) manner, maintaining the sequence of operations. One such operation may be validating that the file is stored in the second file type 246, e.g., by checking the file format, structure, metadata, and/or content to ensure it meets the expected specifications. Any validation errors or discrepancies may be logged in the logging database 240 and/or handled accordingly.

Namely, if the validation performed at block 246 results in a determination that the file was not converted into the second file type and/or that the file otherwise represents an invalid second file type (block 247), the workflow may cease processing operations on the file. The systems described herein may return, for example, to block 243 to attempt a subsequent conversion of the original file into the second file type, and/or may generate an alert message indicating that the file cannot be processed due to formatting inconsistencies. However, if the validation performed at block 246 results in a determination that the file was successfully converted into the second file type and/or that the file otherwise represents a valid second file type (block 248), the queue service may queue the file for text extraction (block 249), and may manage the logging of relevant data/information (block 250) in the logging database 240.

In particular, at block 250, the queue service may transmit a request to the text extraction service 251 to process the file data in the second file type. This request may be an asynchronous request, meaning that the processing of the request may not happen immediately. Instead, the request may be queued for processing at a later time by the service 251. The request may also include an indication of intended service functions, such as requesting a layout feature of the text extraction service 251 to analyze and extract text while preserving the layout and formatting of the original file. This at least partially enables the systems described herein to maintain the visual structure of the content (e.g., text positioning, font styles, tables) for further processing operations, as described.

Once the text extraction service 251 completes the request from the queue service, the service 251 may return the extracted results to the queue service (at block 252) for further handling. The queue service may then pass these results to a receiver 253 for further processing. For example, the receiver 253 may begin the process of collecting/structuring sets of text data based on the extracted information from the service 251. The receiver 253 may also log inputs received from the queue service 252 in the logging database 240 and may independently store the extracted text data in an extracted text storage solution 254.

In any event, the workflow may further include creating the fully formatted and structured sets of text data from the output of the text extraction service 251 at block 255. This process may include the outputs from the receiver 253, as well as additional API requests from the text extraction service 251. For example, the service 251 may generate/transmit a synchronous API request that includes and/or otherwise indicates a "table" and/or "signature" feature to preserve the structure associated with various tables and/or signature regions within the file data. At block 255, the text creation components described herein may utilize the extracted text data to create specific, structured elements from the file for subsequent utilization in generating text-based outputs. These elements may be logged in the logging database 240 and/or stored in a dedicated text file storage location 256.

With the stored, structured text data from the file, an orchestrator 257 may proceed to interface with an AI façade 258 that calls an API service 259 to prompt one or more AI models and subsequently generate outputs/responses to the textual data extracted from the file. When the orchestrator 257 receives the outputs from the AI service 259 through the façade 258, the orchestrator 257 may log the results in the logging database 240 and/or may provide a batch status update through a sender 260 that is ultimately transmitted to a relevant recipient via a messaging service 261 (e.g., via email). The messaging service 261 may be or utilize any suitable form of communication, such as email, instant messaging, web chat, text messaging, phone call, and/or any suitable combinations thereof.

Figure 3A:
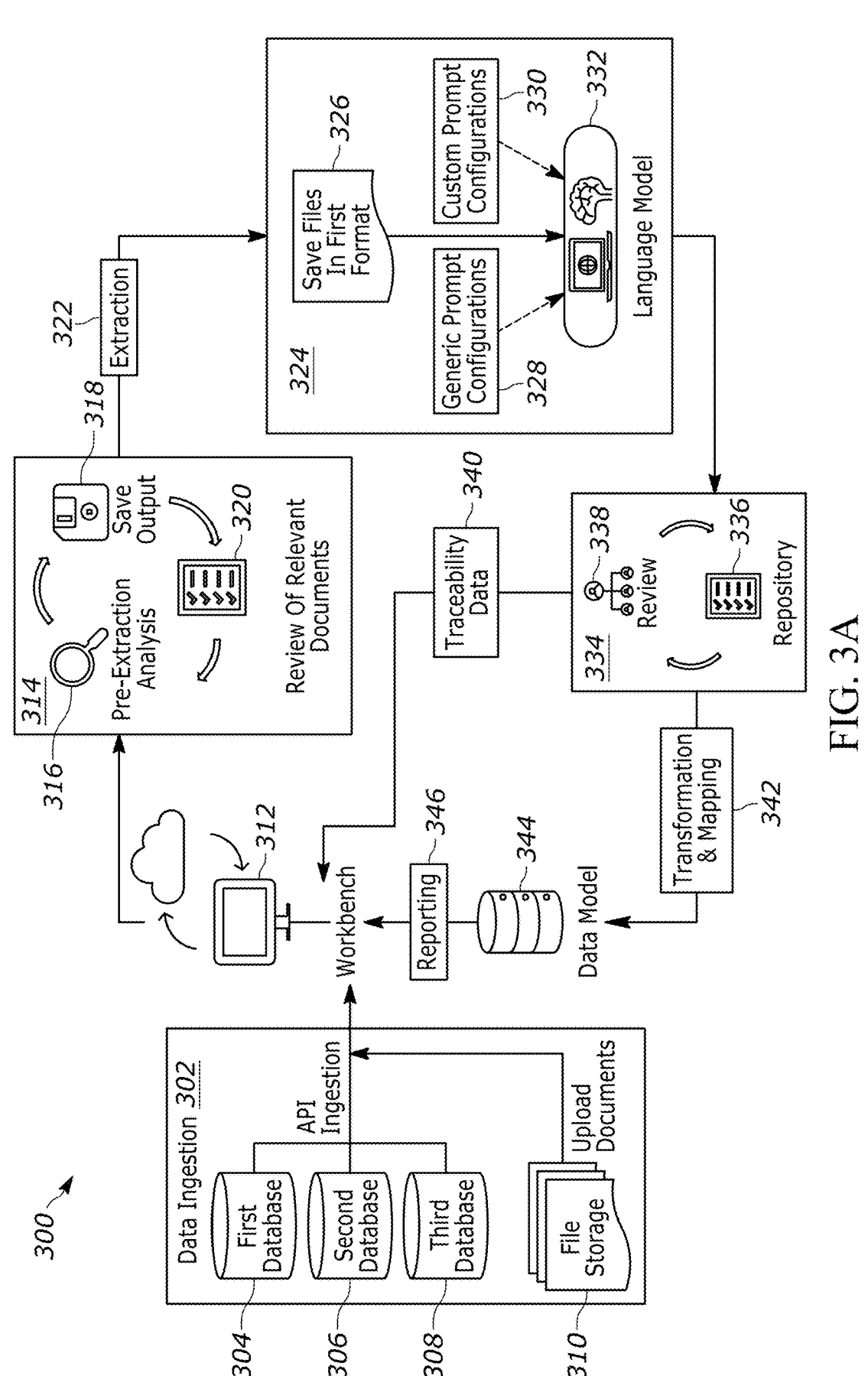
FIG. 3A depicts a first functional workflow associated with improving file processing, in accordance with various embodiments described herein.

FIG. 3A depicts a first functional workflow 300 associated with improving file processing, in accordance with various embodiments described herein. The first functional workflow 300 includes an initial data ingestion process 302 that broadly includes data ingestion into the processing components described herein, the data being associated with an input file (e.g., a new contract document, etc.). The data ingestion process 302 includes a set of software platforms 304, 306, and 308, which may each provide different functions that may be ingested into the workbench 312. For example, these platforms 304, 306, 308 may be file management platforms that may each provide one or more APIs that allow external systems to interact with and integrate data into the functional workflow 300. The data ingestion process 302 may further include uploading file from the file storage location 310 into the workbench 312.

The workbench 312 may generally be or include processing components (e.g., local and/or cloud-based) that are configured to facilitate the various functions described herein. For example, the workbench 312 may utilize the APIs and file data ingested from the data ingestion process 302 to execute a data pre-processing process 314 that is generally configured to pre-process the file data. This process 314 may include a pre-extraction analysis 316 which may generally include preparatory steps and processing tasks that occur before feeding the file data into a text extraction service. For example, the data pre-processing process 314 may include file type identification, format conversion, a data quality check, language detection, text localization, noise reduction, page segmentation, table detection, content parsing, and/or any other suitable processes or combinations thereof. These outputs of the data pre-processing process 314 may be stored in a suitable location 318 and may be validated against known files/rules 320.

The workflow 300 may further include performing the textual extraction 322 to extract textual data and metadata from the pre-processed file data. This extracted textual data and/or metadata may be fed into a prompt configuration process 324, which may generally receive and analyze the output textual data and metadata to generate prompts that are input into a language model 332. Namely, the extracted textual data and/or metadata may be stored in a first format 326 for later use in combination with the generic prompt configurations 328 and/or the custom prompt configurations 330. The generic prompt configurations 328 may be or include prompt configuration instructions that include general guidelines/instructions to include in a prompt for the language model 332 that may be relevant to most/many file interpretation and/or analysis tasks. In contrast, the custom prompt configurations 330 may include specific guidelines/instructions to include in a prompt for the language model 332 that are dynamically configured to facilitate the specific analysis tasks that may be required based on the data included as part of the extracted text data and/or metadata, as described herein.

The language model 332 may receive the prompts resulting from the extracted textual data and/or metadata and the generic prompt configurations 328 and/or the custom prompt configurations 330 and may output one or more responses. These responses may be analyzed as part of a storage and validation process 334, whereby the responses are stored in a repository 336 and may be subject to validation/review 338 by the various validation/correction components described herein. As a result of the validation/review 338, the process 334 may output traceability data 340 to the workbench 312 that may include data regarding the validation process, such as any corrections made or support for the statements included in the response(s).

The data stored in the repository 336 may be loaded into a transformation and mapping component 342, which may generally organize and/or standardize the data, converting it into a format that aligns with the data model 344. For example, the outputs from the repository 336, generated by the large language model 332, may contain raw or processed data that needs to be structured and formatted for further analysis. To facilitate this structuring/formatting, the transformation and mapping component 342 may map the data in the received output to establish relationships between the raw outputs from the language model 332 and the corresponding fields in the data model 344. The transformation and mapping component 342 may further normalize and standardize the data values to ensure consistency and uniformity across different data points, such as by converting data formats, correcting inconsistencies, and/or aligning data structure for cohesive integration into the data model 344. In certain embodiments, the transformation and mapping component 342 may further define the structure of the data model 344, including tables, fields, relationships, and/or data types that will accommodate the transformed data. The component 342 may then load the transformed and mapped data into the data model 344, ensuring that the data is correctly inserted into the designated tables and fields. With the data organized into the data model 344, the data may then be reported 346 to the workbench 312 where it may be accessed/leveraged for any further downstream analysis.

Figure 3B:
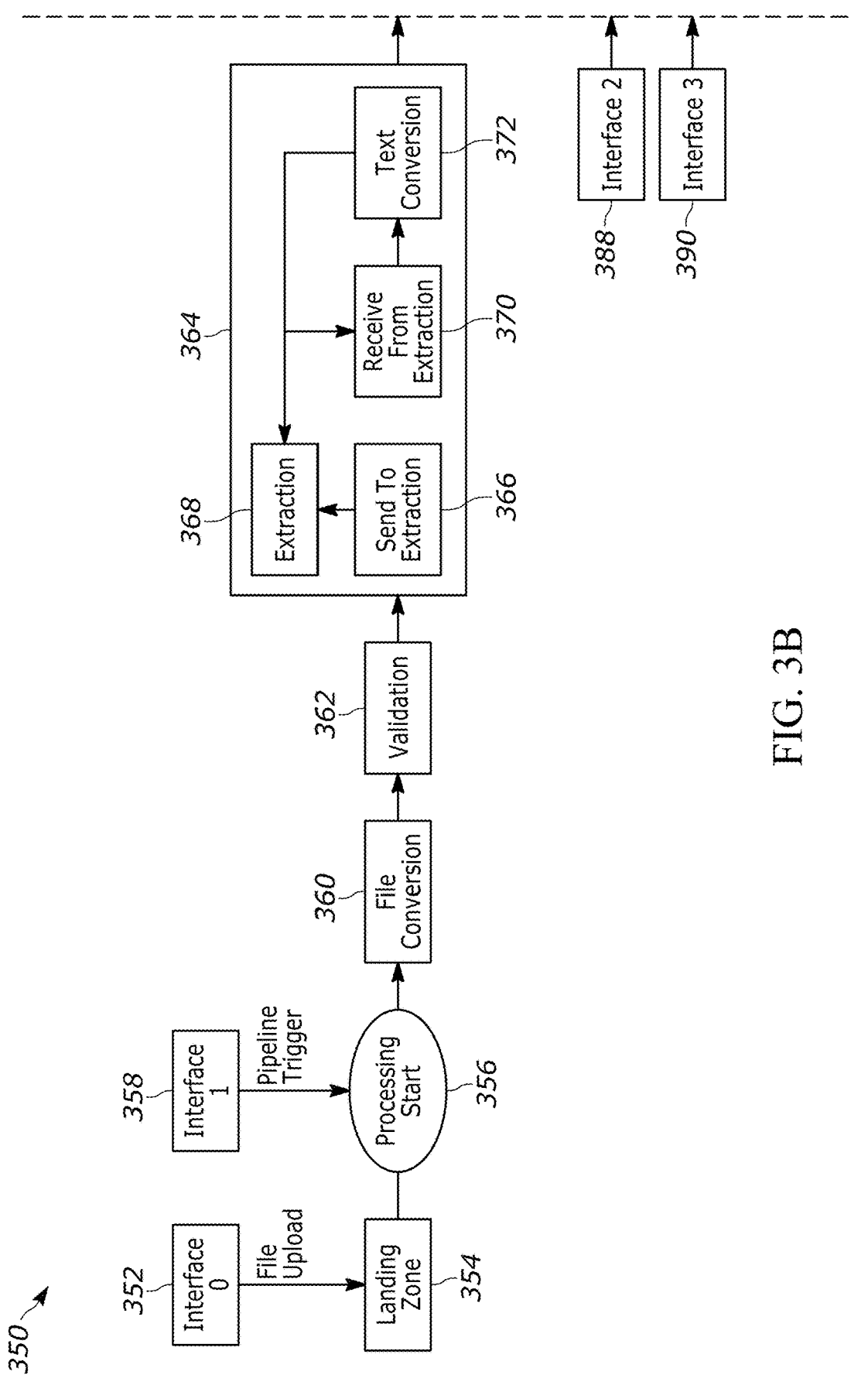
FIG. 3B depicts a second functional workflow associated with improving file processing, in accordance with various embodiments described herein.
Figure 3B:
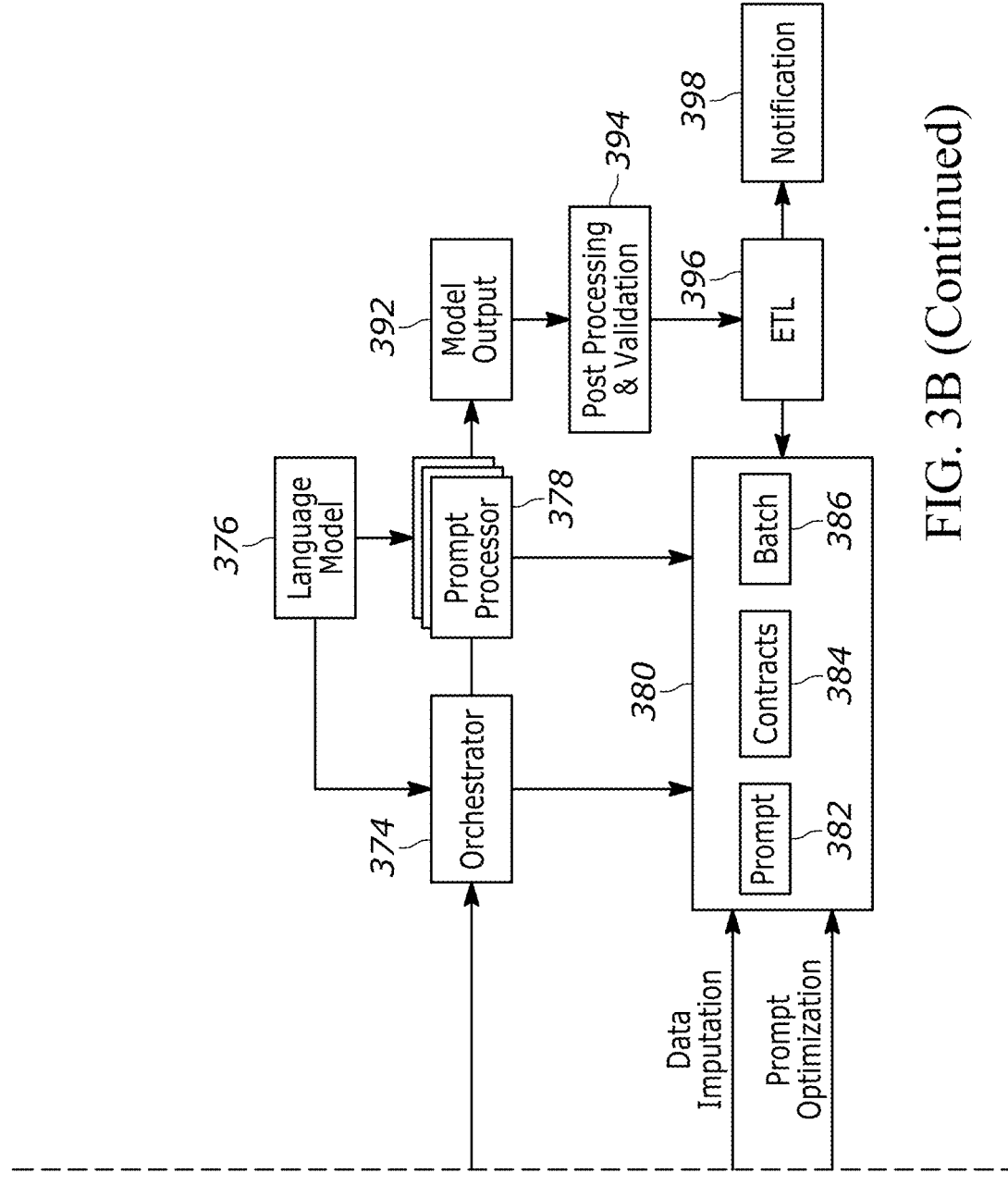

FIG. 3B depicts a second functional workflow 350 associated with improving file processing, in accordance with various embodiments described herein. The second functional workflow 350 generally includes a functional representation of the various interfaces and certain other functional components described herein performing various actions generally represented by the first functional workflow 300 of FIG. 3A. The second functional workflow 350 includes a first interface 352 (e.g., "Interface 0") uploading a file to a landing zone 354. The landing zone 354 may generally be or represent a storage location for the file data where it is held until the systems described herein receive a pipeline trigger to initiate the various processing functions described herein.

The second interface 358 (e.g., "Interface 1") may provide the pipeline trigger to initiate processing (block 356), which may begin with a file conversion (block 360). As described herein, the file conversion may be an optional step based on the file type of the file when uploaded by the first interface 352. For example, if the file uploaded by the first interface 352 is in a PDF format, and the file conversion at block 360 is to convert non-PDF files into PDF files, then the file conversion of block 360 may be skipped. Regardless, once the file is in the appropriate format, the workflow 350 may proceed to block 362, where the file is validated to, e.g., ensure that the conversion was successful prior to submitting the file for textual data/metadata extraction.

Upon successful validation, the file data may be passed to an extraction block 364 that may include various textual data and/or metadata extraction components that may utilize various extraction techniques, as described herein. For example, the file data may be sent (block 366) to the extraction component 368 for textual data extraction, and the component 368 may utilize OCR and/or other similar techniques to perform textual data and/or metadata extraction from the file data. The extraction block 364 may include receiving (block 370) the outputs of the extraction component 368 and performing a text conversion 372 on the outputs. As described herein, the text conversion 372 may include performing table identification, signature identification, and/or otherwise analyzing the extracted data to more accurately preserve relevant formatting characteristics within the file data.

Once the textual data and metadata are extracted, the extraction block 364 may pass the data to the orchestrator 374 for subsequent processing. The orchestrator 374 may generally facilitate/coordinate various processing function-alities using the extracted data, such as by feeding the extracted textual data and metadata into the language model 376 by formulating prompts that include relevant informa-tion from the files (e.g., generated by the prompt processor 378). These prompts may serve as input for the language model 376 to generate responses or derive insights based on the provided data. The language model 376 may utilize the information in the prompts to interpret and analyze the content, enabling it to answer questions, provide contextual understanding, and/or generate text based on the extracted data. The orchestrator 374 may receive the responses or outputs generated by the language model 376 and may further process, visualize, and/or utilize this information (e.g., along with the prompt processor 378) for further downstream processing.

For example, the orchestrator 374 and the prompt pro-cessor 378 may leverage the database 380 to organize, generate, and/or re-formulate/revise prompts for the lan-guage model 376. The database 380 may include a set of prompt instructions 382, a set of file data 384, and/or a set of batch data 386. This database 380 may also be commu-nicatively coupled with a third interface 388 and a fourth interface 390, which may assist the orchestrator 374 and/or the prompt processor 378 by performing data imputation and/or prompt optimization, respectively.

Regardless, when the language model 376 generate an output in response to a prompt provided by, e.g., the prompt processor 378, the processor 378 may further format, vali-date, and/or otherwise process the model output 392 (block 394). As an example, the prompt processor 378 and/or other suitable processing component(s) described herein may vali-date and correct any errors included in the model output 392. Following the post processing and validation 394, the work-flow 350 may include performing an extract, transform, and load process 396 that may generally adjust the formatting of the model output 392 to suit the specifications of a data model (e.g., stored in the database 380) and for storage in the database 380. Once properly formatted, the workflow 350 may include generating/transmitting a notification 398 that includes the data. For example, the notification 398 may be or include a message to a user that includes and/or otherwise indicates the data output by the model 376 and validated and formatted in accordance with the stored rules in the database 380.

FIG. 4A depicts a one-to-one (1:1) relationship preserva-tion sequence 400 corresponding to the data extraction processes described herein, and in accordance with various embodiments described herein. Generally speaking, and as described herein, a 1:1 relationship may signify a direct association between two entities where each entity in one set corresponds to exactly one entity in another set. This con-trasts with a one-to-many relationship, where one entity may be associated with multiple entities in another set. For example, an effective date in a file (e.g., a contract) typically corresponds to a single date and entity, creating a 1:1 relationship. By executing this sequence 400, the processing devices/components described herein may effectively extract, validate, and preserve 1:1 relationships from files.

As illustrated in FIG. 4A, the sequence 400 includes a file portion 401 that features at least one 1:1 relationship. Namely, the file portion 401 features an effective date that may represent the date on which the terms of the corre-sponding document go into effect, and this date value (e.g., Apr. 1, 2017) may have a 1:1 relationship with the effective date field within the file. Thus, anywhere within the remain-der of the file that references the "effective date" may necessarily reference this single date value. When the file portion 401 is evaluated by the 1:1 relationship recognition and preservation component 404, the component 404 may recognize this 1:1 relationship and preserve this association in metadata and/or other data components that influence the outputs of the larger systems described herein. In doing so, the 1:1 relationship recognition and preservation component 404 may utilize any of the processing components and/or corresponding algorithms, models, and/or applications described herein to extract, validate, and preserve 1:1 rela-tionships from files.

More specifically, the 1:1 relationship recognition and preservation component 404 may identify the relevant sec-tions of the file that contain the 1:1 relationship data, such as the effective date, by employing text extraction tools and/or OCR software to extract text and specific data from the file portion accurately. The component 404 may then validate the extracted data to ensure that the effective date and other 1:1 relationship details are captured correctly and completely, and map the extracted data elements (e.g., including the effective date 402), to corresponding fields in a structured data model. Once validated, the component 404 may associate each unique data element, such as the effec-tive date 402, with its specific entity or record in the data model to maintain the 1:1 relationship. For example, as illustrated in the sequence 400, the 1:1 relationship recog-nition and preservation component 404 may generate out-puts 405 including a plurality of terms and/or other data entries extracted from the file that all include the same effective date 402 (e.g., as indicated by entry 406).

In certain embodiments, the component 404 may further normalize the extracted data to ensure consistency and standardization, such as by formatting the effective date 402 into a consistent date format to align with the data model's requirements. This normalization may handle any variations or discrepancies in the extracted data to maintain uniformity in the 1:1 relationship mapping. Moreover, the component 404 may store the extracted and normalized data in a database or structured repository and may create a dedicated table or entity in the database to store the extracted 1:1 relationship data, ensuring that each entity corresponds to a unique record. Thus, the component 404 may maintain referential integrity by preserving the 1:1 relationship between the effective date 402 and its associated entity throughout the data extraction and loading process and may also implement validation mechanisms to prevent data duplication or inconsistencies in the 1:1 relationship repre-sentation.

In contrast, FIG. 4B depicts a one-to-many (1:N) rela-tionship preservation sequence 420 corresponding to the data extraction processes described herein, and in accor-dance with various embodiments described herein. As ref-erenced herein a 1:N relationship may reference any rela-tionship in which one entity may be associated with multiple entities in another set, such that N may be any integer value. In any event, by following the sequence 420, the processing components described herein may effectively extract, struc-ture, and preserve 1:N relationships present in files. The structured approach ensures that the complexities of multi-faceted relationships, such as deliverables, payments, and/or multiple entities involved, are accurately captured and main-tained for comprehensive analysis.

As illustrated in the 1:N relationship preservation sequence 420, the file portion 421 includes a first table 422 including multiple 1:N relationships and a row 424 of a second table including a 1:N relationship. For example, the first table 422 may include current procedural terminology (CPT) codes with their corresponding allowed amounts based on two different dates, and the first row 424 of the second table may include payment rates for surgery codes that require implants. Both of these sections of the file portion 421 may thus represent 1:N relationships, wherein multiple values extracted from the file may correspond to the same field or group. For the first table 422, the $15,000 value in the "Allowed Amount 01-01-2018" column and the $13,000 value in the "Allowed Amount 01-01-2019" column both correspond to the CPT code "22551", and similar 2:1 relationships exist for each CPT code in the first table 422. For the first row 424 of the second table, the surgery codes that require implants corresponds to both the 220% of the X base rate value in the "Effective Jan. 1, 2018" column and the 190% of the X base rate value in the "Effective Jan. 1, 2019" column.

More specifically, a 1:N relationship recognition and preservation component 426 may identify sections of the file that contain 1:N relationships, such as the reimbursement methodologies represented in the file portion 421 that each have multiple values associated with a single value. The component 426 may utilize text extraction tools and/or OCR software to extract text and relevant data pertaining to the 1:N relationships from the file and thereby capture details such as individual deliverables, payment amounts, due dates, and/or parties involved in the contract. The component 426 may then map the extracted data to the appropriate fields in a structured data model, accommodating 1:N relationships and may create tables or entities in the database to represent the multiple instances associated with each primary entity in the file, maintaining the 1:N relationships.

For example, in the output 427, the component 426 may create a table or spreadsheet that includes a row for each of the single values having the 1:N relationships, and each row may have multiple columns that feature the N corresponding values. The first row of the output 427 may correspond to the first row 424 of the second table in the file portion 412 and may include a set of columns 428 indicating the surgery codes that require implants, along with the multiple corresponding reimbursement percentages. The set of rows associated with the data collection 430 may each correspond to a CPT code, and each row may have columns (e.g., column 432) that includes at least one of the corresponding reimbursement values for the associated CPT code. Thus, the output 427 includes a complete indication of the extracted data values and a full listing of their corresponding data relationships.

In certain embodiments, the component 426 may also normalize the extracted data to ensure consistency and standardization across the multiple instances of the 1:N relationship elements. Once normalized, the component 426 may further load the extracted data into the database and each primary entity (e.g., CPT codes, "Surgery Codes that require implants") should be associated with multiple related instances (e.g., reimbursement values) based on the extracted file details. The component 426 may, e.g., establish foreign key relationships or join tables to link the primary entity to its multiple related instances. To ensure the 1:N relationships are maintained throughout the processing, the component 426 may also implement data integrity constraints to enforce referential integrity and maintain the coherence of the 1:N relationships, such that updates or modifications to the primary entity reflect accurately across all associated instances within the 1:N relationship.

Example Computer-Implemented Methods

Figure 5:
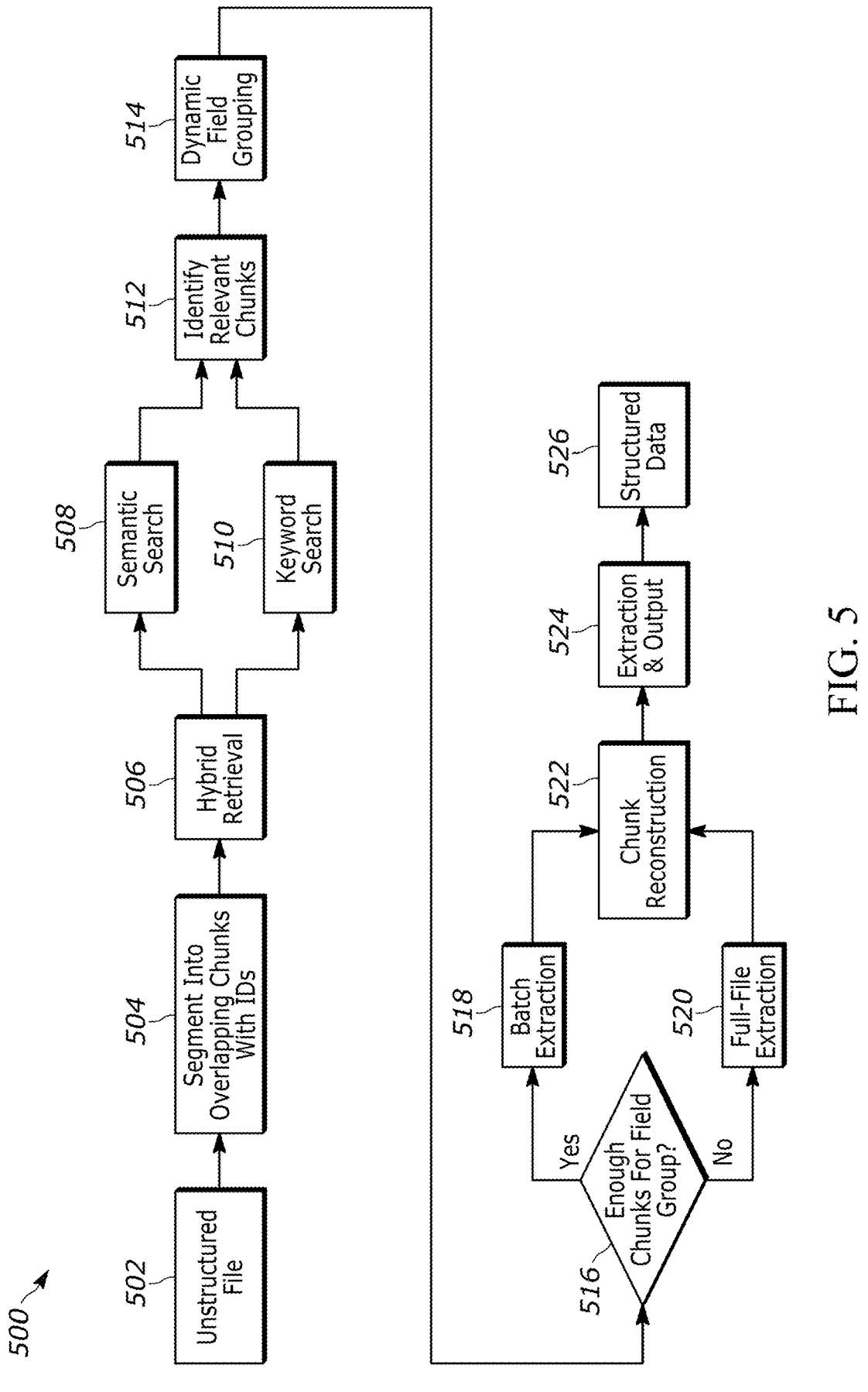
FIG. 5 depicts a first flow diagram representing an example computer-implemented method, in accordance with various embodiments described herein.

FIG. 5 depicts a first flow diagram representing an example computer-implemented method 500, in accordance with various embodiments described herein. The method 500 may be implemented by one or more processors of the example system 100, such as the processor 104 of the computing system 102 (e.g., by file processing application 112), for example.

The method 500 may include processing an unstructured file 502 by segmenting the file into overlapping chunks with IDs (block 504). As described herein, the processing components may evaluate the unstructured file to generate the file chunks that may include some overlap, e.g., based on contextual similarity values between adjacent preliminary text chunks. The processing components may assign each of these chunk segments with an ID for subsequent reference during the grouping and reconstruction processes represented by the rest of the method 500. These text chunks may also be referenced herein as "preliminary text chunks".

The method 500 may further include executing a hybrid retrieval process to determine the relevant text chunks that may be associated together as a group (block 506). Namely, the hybrid retrieval process may include a semantic search (block 508) and a keyword search (block 510) that results in the processing components described herein identifying/determining the relevant text chunks within the file (block 512). Based on the results of block 512, the processing components described herein may further perform a dynamic field grouping 514 that group together all of the text chunks that are identified as relevant or substantially similar to one another, yielding a set of field groups that each include one or more text chunks.

The method 500 may further include determining whether each field group includes a sufficient number of text chunks to perform batch extraction of the file data (block 516). The processing components may compare, e.g., the number of text chunks included in a field group with a chunk threshold to make the determination. If the processing components determine that there are enough text chunks in the field group to perform batch extraction, the processing components described herein may determine that a batch extraction of the text chunks should be performed (block 518). However, if the processing components determine that there are not enough text chunks in the field group to perform batch extraction (e.g., does not satisfy the chunk threshold), the processing components described herein may determine that a full-text extraction of the text chunks should be performed (block 520).

The method 500 may then further include performing chunk reconstruction based on the text chunks (block 522). The chunk reconstruction may generally comprise merging text chunks, deduplicating the chunks, and re-ordering the text chunks. In certain embodiments, block 522 may include merging the preliminary text chunks of the field group into a first text chunk, deduplicating, by an overlap detection and deduplication algorithm (e.g., algorithm 142), redundant portions of the first text chunk, and/or reordering one or more non-redundant portions of the first text chunk. The method 500 may further include extracting and outputting these reconstructed text chunks (block 524). Consequently, the method 500 may further include outputting the structured data (block 526) that includes the structured text chunks.

Of course, it is to be appreciated that the actions of the method 500 may be performed any suitable number of times, and that the actions described in reference to the method 500 may be performed in any suitable order.

Figure 6:
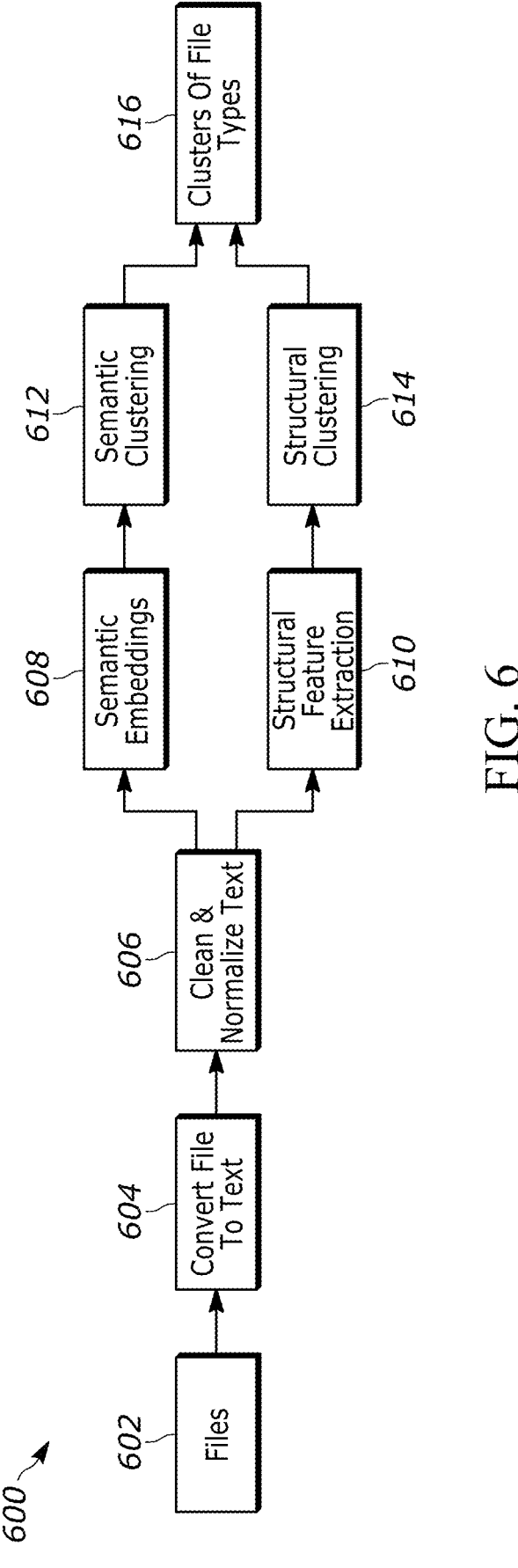
FIG. 6 depicts a second flow diagram representing an example computer-implemented method, in accordance with various embodiments described herein.

FIG. 6 depicts a second flow diagram representing an example computer-implemented method 600, in accordance with various embodiments described herein. The method

600 may be implemented by one or more processors of the example system 100, such as the processor 104 of the computing system 102 (e.g., by file processing application 112), for example. The method 600 may include receiving a file (block 602) and converting the file to a text format (block 604). Converting the file from the initial format (e.g., a PDF file) to a text format, may enable the cleaning and normalization functions performed at block 606.

With the cleaned and normalized text data, the method 600 may include generating semantic embeddings of the text data (block 608) and extracting the structural features of the text data (block 610), as described herein. Using the semantic embeddings, the method 600 may further include performing semantic clustering of the file based on the semantic embeddings of the text data (block 612), which may generally result in clustering the file with other files based on the semantic similarity of the text of such files. For example, the processing components described herein may utilize a k-means clustering algorithm to cluster the file based on the semantic embeddings into a semantic cluster of a set of semantic clusters. The method 600 may further include performing structural clustering of the file based on the extracted structural features. As an example, the processing components described herein may utilize a DBSCAN algorithm to perform the structural clustering of the file into a structural cluster of a set of structural clusters.

The method 600 may further include determining a final cluster for the file based on a combination of the semantic cluster and the structural cluster (block 616). For example, the processing components described herein may analyze the structural similarities of the files in the structural cluster and the semantic similarities of the files in the semantic cluster containing the file and may determine a combined cluster that comprises a subset of files that are contained in both the semantic cluster and the structural cluster. In this manner, the processing components may ensure that the file is clustered with other files that share both semantic similarities and structural similarities with the file. This combined cluster may be a new cluster the processing components generate as a result of the comparisons performed between the semantic cluster and the structural cluster for any given file and/or may utilize a set of predetermined combined clusters that already contain files clustered together as a result of this analysis performed for previous files.

Of course, it is to be appreciated that the actions of the method 600 may be performed any suitable number of times, and that the actions described in reference to the method 600 may be performed in any suitable order.

FIG. 7 depicts a third flow diagram representing an example computer-implemented method 700, in accordance with various embodiments described herein. The method 700 may be implemented by one or more processors of the example system 100, such as the processor 104 of the computing system 102 (e.g., by file processing application 112), for example.

The method 700 may include extracting, using an extraction algorithm, (i) textual data from a file and (ii) metadata from the file in a hierarchical format configured to preserve hierarchical data structures of the file including at least a first one-to-many relationship indicated in the textual data (block 702). The method 700 may further include converting, using an embedding algorithm, the extracted textual data into at least one embedding corresponding to the file (block 704). The method 700 may further include decomposing, using a smart chunking algorithm based on the extracted metadata, the extracted textual data into a set of text chunks at least partially by performing (i) a semantic search and (ii) a keyword search on the extracted textual data (block 706).

The method 700 may further include clustering the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster (block 708). The method 700 may further include generating, using a language model and based on the first cluster, an output corresponding to the file (block 710). The method 700 may further include causing the output to be displayed for viewing by a user (block 712).

In certain embodiments, decomposing the extracted textual data into the set of text chunks using the smart chunking algorithm may further include determining (i) contextual similarity between one or more portions of the extracted textual data, (ii) a set of chunk size and overlap parameters associated with the one or more portions based on the contextual similarity, and (iii) a plurality of preliminary text chunks corresponding to the set of chunk size and overlap parameters, wherein at least a first preliminary text chunk of the plurality of preliminary text chunks has an overlap portion associated with another respective preliminary text chunk of the plurality of preliminary text chunks, and wherein the one or more portions of the extracted textual data have an associated field indicated by the extracted metadata; applying a set of sequential identifiers to the plurality of preliminary text chunks; and/or grouping, based on (i) outputs of the semantic search and the keyword search on the plurality of preliminary text chunks and (ii) the associated field of the one or more portions, the plurality of preliminary text chunks into one or more field groups.

In certain embodiments, the method 700 may further include determining whether a first field group of the one or more field groups satisfies a chunk threshold; responsive to determining that the first field group satisfies the chunk threshold: merging the preliminary text chunks of the first field group into a first text chunk, deduplicating, by an overlap detection and deduplication algorithm, redundant portions of the first text chunk, reordering one or more non-redundant portions of the first text chunk, and extracting the first text chunk comprising the first field group from the one or more field groups; and/or responsive to determining that the first field group fails to satisfy the chunk threshold: merging at least one chunk from at least a second field group of the one or more field groups with the preliminary text chunks of the first field group into a second text chunk, deduplicating, by the overlap detection and deduplication algorithm, redundant portions of the second text chunk, reordering one or more non-redundant portions of the second text chunk, and extracting the second text chunk from the one or more field groups.

In certain embodiments, the method 700 may further include applying the structural clustering algorithm by at least one of executing a set of regex-based heuristic instructions and a set of rule-based heuristic instructions to detect at least one of: (i) a common clause structure, (ii) a keyword, or (iii) a formatting pattern associated with the file and at least one file represented in the set of structural clusters; executing a spectral clustering pattern recognition algorithm configured to identify at least one cluster within the set of structural clusters associated with the file based on one or more file structural components of the file; and/or executing an affinity propagation pattern recognition algorithm configured to cluster the file into the set of structural clusters based on one or more formatting features of the file.

In certain embodiments, the method 700 may further include clustering the file into the first cluster based on the similarity between the semantic cluster and the structural cluster by determining, by a projection algorithm, (i) a two-dimensional (2D) projection of at least the semantic cluster and the structural cluster, and (ii) a cross-tabulation heatmap indicating the similarity between at least the semantic cluster and the structural cluster; generating, by a visualization algorithm, a feature visualization indicating the cross-tabulation heatmap corresponding to at least the semantic cluster and the structural cluster; and/or causing the feature visualization to be displayed on a user interface for viewing by a user.

In certain embodiments, up to each cluster in the set of structural clusters may correspond to at least one unique feature of the set of features comprising: (i) a table density and complexity value, (ii) an indicator presence value, (iii) an exhibit or attachment format, and/or (iv) a line length and formatting consistency value.

In certain embodiments, the semantic clustering algorithm may include a k-means clustering algorithm, and the structural clustering algorithm may include a hierarchical DBSCAN algorithm.

In certain embodiments, the first cluster may correspond to a set of domain-specific terminology, and the method 700 may further include determining a file class associated with the file based on the extracted textual data; generating, by a prompt optimization algorithm, a prompt based on the extracted textual data from the file, the first cluster, and the file class associated with the file; and/or generating, by the language model, the output corresponding to the file based on the prompt.

In certain embodiments, the method 700 may further include generating the prompt by training, by the prompt optimization algorithm, the language model using at least one of: (i) a few-shot learning technique or (ii) a multi-shot learning technique; and/or updating, by the prompt optimization algorithm, the prompt based on outputs of the language model associated with the training.

In certain embodiments, the method 700 may further include identifying, by a real-time tracking and self-repair algorithm, a failed process or an incomplete process during any of the extracting, the converting, the decomposing, the clustering, or the generating; determining, by the real-time tracking and self-repair algorithm, whether the failed process or the incomplete process is associated with a current process or a prior process; and/or adjusting, by the real-time tracking and self-repair algorithm, a parameter of the current process or the prior process based on the determining.

In certain embodiments, the method 700 may further include extracting the metadata from the file by extracting, by the extraction algorithm, the metadata into the hierarchical format that indicates at least one field corresponding to the file, the at least one field being associated with a plurality of nested data indicating a structure of the extracted textual data corresponding to the at least one field; and/or storing the extracted metadata in a storage location in the hierarchical format.

Of course, it is to be appreciated that the actions of the method 700 may be performed any suitable number of times, and that the actions described in reference to the method 700 may be performed in any suitable order.

Aspects

Aspect 1. A computer-implemented system for improved file processing, comprising: one or more processors; and one or more memories storing computer-executable instructions thereon that, when executed by the one or more processors, cause the computer-implemented system to perform operations comprising: extracting, using an extraction algorithm, (i) textual data from a file and (ii) metadata from the file in a hierarchical format configured to preserve hierarchical data structures of the file including at least a first one-to-many relationship indicated in the textual data, converting, by an embedding algorithm, the extracted textual data into at least one embedding corresponding to the file, decomposing, using a smart chunking algorithm based on the extracted metadata, the extracted textual data into a set of text chunks at least partially by performing (i) a semantic search and (ii) a keyword search on the extracted textual data, clustering the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster, generating, by a language model and based on the first cluster, an output corresponding to the file, and causing the output to be displayed for viewing by a user.

Aspect 2. The computer-implemented system of aspect 1, wherein decomposing the extracted textual data into the set of text chunks using the smart chunking algorithm further comprises: determining (i) contextual similarity between one or more portions of the extracted textual data, (ii) a set of chunk size and overlap parameters associated with the one or more portions based on the contextual similarity, and (iii) a plurality of preliminary text chunks corresponding to the set of chunk size and overlap parameters, wherein at least a first preliminary text chunk of the plurality of preliminary text chunks has an overlap portion associated with another respective preliminary text chunk of the plurality of preliminary text chunks, and wherein the one or more portions of the extracted textual data have an associated field indicated by the extracted metadata; applying a set of sequential identifiers to the plurality of preliminary text chunks; and grouping, based on (i) outputs of the semantic search and the keyword search on the plurality of preliminary text chunks and (ii) the associated field of the one or more portions, the plurality of preliminary text chunks into one or more field groups.

Aspect 3. The computer-implemented system of aspect 2, further comprising: determining whether a first field group of the one or more field groups satisfies a chunk threshold; responsive to determining that the first field group satisfies the chunk threshold: merging the preliminary text chunks of the first field group into a first text chunk, deduplicating, by an overlap detection and deduplication algorithm, redundant portions of the first text chunk, reordering one or more non-redundant portions of the first text chunk, and extracting the first text chunk comprising the first field group from the one or more field groups; and responsive to determining that the first field group fails to satisfy the chunk threshold: merging at least one chunk from at least a second field group of the one or more field groups with the preliminary text chunks of the first field group into a second text chunk, deduplicating, by the overlap detection and deduplication algorithm, redundant portions of the second text chunk, reordering one or more non-redundant portions of the second text chunk, and extracting the second text chunk from the one or more field groups.

Aspect 4. The computer-implemented system of any of aspects 1-3, wherein applying the structural clustering algorithm further comprises at least one of: executing a set of regex-based heuristic instructions and a set of rule-based heuristic instructions to detect at least one of: (i) a common clause structure, (ii) a keyword, or (iii) a formatting pattern associated with the file and at least one file represented in the set of structural clusters; executing a spectral clustering pattern recognition algorithm configured to identify at least one cluster within the set of structural clusters associated with the file based on one or more file structural components of the file; or executing an affinity propagation pattern recognition algorithm configured to cluster the file into the set of structural clusters based on one or more formatting features of the file.

Aspect 5. The computer-implemented system of any of aspects 1-4, wherein clustering the file into the first cluster based on the similarity between the semantic cluster and the structural cluster further comprises: determining, by a projection algorithm, (i) a two-dimensional (2D) projection of at least the semantic cluster and the structural cluster, and (ii) a cross-tabulation heatmap indicating the similarity between at least the semantic cluster and the structural cluster; generating, by a visualization algorithm, a feature visualization indicating the cross-tabulation heatmap corresponding to at least the semantic cluster and the structural cluster; and causing the feature visualization to be displayed on a user interface for viewing by a user.

Aspect 6. The computer-implemented system of any of aspects 1-5, wherein each cluster in the set of structural clusters corresponds to at least one unique feature of the set of features comprising: (i) a table density and complexity value, (ii) an indicator presence value, (iii) an exhibit or attachment format, or (iv) a line length and formatting consistency value.

Aspect 7. The computer-implemented system of any of aspects 1-6, wherein the semantic clustering algorithm comprises a k-means clustering algorithm, and wherein the structural clustering algorithm comprises a hierarchical density-based spatial clustering of applications with noise (DB-SCAN) algorithm.

Aspect 8. The computer-implemented system of any of aspects 1-7, wherein first cluster corresponds to a set of domain-specific terminology, and wherein the computer-executable instructions, when executed by the one or more processors, further cause the computer-implemented system to perform operations comprising: determining a file class associated with the file based on the extracted textual data; generating, by a prompt optimization algorithm, a prompt based on the extracted textual data from the file, the first cluster, and the file class associated with the file; and generating, by the language model, the output corresponding to the file based on the prompt.

Aspect 9. The computer-implemented system of aspect 8, wherein generating the prompt further comprises: training, by the prompt optimization algorithm, the language model using at least one of: (i) a few-shot learning technique or (ii) a multi-shot learning technique; and updating, by the prompt optimization algorithm, the prompt based on outputs of the language model associated with the training.

Aspect 10. The computer-implemented system of any of aspects 1-9, wherein the computer-executable instructions, when executed by the one or more processors, further cause the computer-implemented system to perform operations comprising: identifying, by a real-time tracking and self-repair algorithm, a failed process or an incomplete process during any of the extracting, the converting, the decomposing, the clustering, or the generating; determining, by the real-time tracking and self-repair algorithm, whether the failed process or the incomplete process is associated with a current process or a prior process; and adjusting, by the real-time tracking and self-repair algorithm, a parameter of the current process or the prior process based on the determining.

Aspect 11. The computer-implemented system of any of aspects 1-10, wherein extracting the metadata from the file further comprises: extracting, by the extraction algorithm, the metadata into the hierarchical format that indicates at least one field corresponding to the file, the at least one field being associated with a plurality of nested data indicating a structure of the extracted textual data corresponding to the at least one field; and storing the extracted metadata in a storage location in the hierarchical format.

Aspect 12. A non-transitory computer-readable medium storing instructions thereon that, when executed by one or more processors, cause the one or more processors to: extract, using an extraction algorithm, (i) textual data from a file and (ii) metadata from the file in a hierarchical format configured to preserve hierarchical data structures of the file including at least a first one-to-many relationship indicated in the textual data; convert, by an embedding algorithm, the extracted textual data into at least one embedding corresponding to the file; decompose, using a smart chunking algorithm based on the extracted metadata, the extracted textual data into a set of text chunks at least partially by performing (i) a semantic search and (ii) a keyword search on the extracted textual data; cluster the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster; generate, by a language model and based on the first cluster, an output corresponding to the file; and cause the output to be displayed for viewing by a user.

Aspect 13. The non-transitory computer-readable medium of aspect 12, wherein decomposing the extracted textual data into the set of text chunks using the smart chunking algorithm further comprises: determining (i) contextual similarity between one or more portions of the extracted textual data, (ii) a set of chunk size and overlap parameters associated with the one or more portions based on the contextual similarity, and (iii) a plurality of preliminary text chunks corresponding to the set of chunk size and overlap parameters, wherein at least a first preliminary text chunk of the plurality of preliminary text chunks has an overlap portion associated with another respective preliminary text chunk of the plurality of preliminary text chunks, and wherein the one or more portions of the extracted textual data have an associated field indicated by the extracted metadata; applying a set of sequential identifiers to the plurality of preliminary text chunks; and grouping, based on (i) outputs of the semantic search and the keyword search on the plurality of preliminary text chunks and (ii) the associated field of the one or more portions, the plurality of preliminary text chunks into one or more field groups.

Aspect 14. The non-transitory computer-readable medium of aspect 13, wherein the instructions, when executed by the one or more processors, further cause the one or more processors to perform operations comprising: determining whether a first field group of the one or more field groups satisfies a chunk threshold; responsive to determining that the first field group satisfies the chunk threshold: merging the preliminary text chunks of the first field group into a first text chunk, deduplicating, by an overlap detection and deduplication algorithm, redundant portions of the first text chunk, reordering one or more non-redundant portions of the first text chunk, and extracting the first text chunk comprising the first field group from the one or more field groups; and responsive to determining that the first field group fails to satisfy the chunk threshold: merging at least one chunk from at least a second field group of the one or more field groups with the preliminary text chunks of the first field group into a second text chunk, deduplicating, by the overlap detection and deduplication algorithm, redundant portions of the second text chunk, reordering one or more non-redundant portions of the second text chunk, and extracting the second text chunk from the one or more field groups.

Aspect 15. The non-transitory computer-readable medium of any of aspects 12-14, wherein applying the structural clustering algorithm further comprises at least one of: executing a set of regex-based heuristic instructions and a set of rule-based heuristic instructions to detect at least one of: (i) a common clause structure, (ii) a keyword, or (iii) a formatting pattern associated with the file and at least one file represented in the set of structural clusters; executing a spectral clustering pattern recognition algorithm configured to identify at least one cluster within the set of structural clusters associated with the file based on one or more file structural components of the file; or executing an affinity propagation pattern recognition algorithm configured to cluster the file into the set of structural clusters based on one or more formatting features of the file.

Aspect 16. The non-transitory computer-readable medium of any of aspects 12-15, wherein clustering the file into the first cluster based on the similarity between the semantic cluster and the structural cluster further comprises: determining, by a projection algorithm, (i) a two-dimensional (2D) projection of at least the semantic cluster and the structural cluster, and (ii) a cross-tabulation heatmap indicating the similarity between at least the semantic cluster and the structural cluster; generating, by a visualization algorithm, a feature visualization indicating the cross-tabulation heatmap corresponding to at least the semantic cluster and the structural cluster; and causing the feature visualization to be displayed on a user interface for viewing by a user.

Aspect 17. The non-transitory computer-readable medium of any of aspects 12-16, wherein each cluster in the set of structural clusters corresponds to at least one unique feature of the set of features comprising: (i) a table density and complexity value, (ii) an indicator presence value, (iii) an exhibit or attachment format, or (iv) a line length and formatting consistency value.

Aspect 18. The non-transitory computer-readable medium of any of aspects 12-17, wherein first cluster corresponds to a set of domain-specific terminology, and wherein the instructions, when executed by the one or more processors, further cause the one or more processors to perform operations comprising: determining a file class associated with the file based on the extracted textual data; generating, by a prompt optimization algorithm, a prompt based on the extracted textual data from the file, the first cluster, and the file class associated with the file at least by: training, by the prompt optimization algorithm, the language model using at least one of: (i) a few-shot learning technique or (ii) a multi-shot learning technique, and updating, by the prompt optimization algorithm, the prompt based on outputs of the language model associated with the training; and generating, by the language model, the output corresponding to the file based on the prompt.

Aspect 19. The non-transitory computer-readable medium of any of aspects 12-18, wherein the instructions, when executed by the one or more processors, further cause the one or more processors to perform operations comprising: identifying, by a real-time tracking and self-repair algorithm, a failed process or an incomplete process during any of the extracting, the converting, the decomposing, the clustering, or the generating; determining, by the real-time tracking and self-repair algorithm, whether the failed process or the incomplete process is associated with a current process or a prior process; and adjusting, by the real-time tracking and self-repair algorithm, a parameter of the current process or the prior process based on the determining.

Aspect 20. A computer-implemented method for improved file processing, the computer-implemented method comprising: extracting, by one or more processors and using an extraction algorithm, (i) textual data from a file and (ii) metadata from the file in a hierarchical format configured to preserve hierarchical data structures of the file including at least a first one-to-many relationship indicated in the textual data; converting, by the one or more processors using an embedding algorithm, the extracted textual data into at least one embedding corresponding to the file; decomposing, by the one or more processors using a smart chunking algorithm based on the extracted metadata, the extracted textual data into a set of text chunks at least partially by performing (i) a semantic search and (ii) a keyword search on the extracted textual data; clustering, by the one or more processors, the file into a first cluster of a set of clusters by: executing a semantic clustering algorithm to cluster the at least one embedding into a semantic cluster of a set of semantic clusters, executing a structural clustering algorithm to cluster the set of text chunks into a structural cluster of a set of structural clusters, and clustering the file into the first cluster based on a similarity between the semantic cluster and the structural cluster; generating, by the one or more processors using a language model and based on the first cluster, an output corresponding to the file; and causing, by the one or more processors, the output to be displayed for viewing by a user.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system (e.g., 100) for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed is:

1. A computer-implemented system for improved file processing, comprising:
one or more processors; and
one or more memories storing computer-executable instructions thereon that, when executed by the one or more processors, cause the computer-implemented system to perform operations comprising:
extracting, using an extraction function, (i) textual data from a file and (ii) metadata from the file in a hierarchical format configured to preserve hierarchical data structures of the file including at least a first one-to-many relationship indicated in the textual data,
converting, by an embedding function, the extracted textual data into at least one embedding corresponding to the file,
decomposing, using a smart chunking function based on the extracted metadata, the extracted textual data into a set of text chunks at least partially by performing (i) a semantic search and (ii) a keyword search on the extracted textual data,
clustering the file into a first cluster of a set of clusters by:
executing a semantic clustering function to cluster the at least one embedding into a semantic cluster of a set of semantic clusters, executing a structural clustering process to cluster the set of text chunks into a structural cluster of a set of structural clusters, and
clustering the file into the first cluster based on a similarity between the semantic cluster and the structural cluster,
generating, by a language model and based on the first cluster, an output corresponding to the file, and
causing the output to be displayed for viewing by a user.

2. The computer-implemented system of claim 1, wherein decomposing the extracted textual data into the set of text chunks using the smart chunking function further comprises:
determining (i) contextual similarity between one or more portions of the extracted textual data, (ii) a set of chunk size and overlap parameters associated with the one or more portions based on the contextual similarity, and (iii) a plurality of preliminary text chunks corresponding to the set of chunk size and overlap parameters, wherein at least a first preliminary text chunk of the plurality of preliminary text chunks has an overlap portion associated with another respective preliminary text chunk of the plurality of preliminary text chunks, and wherein the one or more portions of the extracted textual data have an associated field indicated by the extracted metadata;
applying a set of sequential identifiers to the plurality of preliminary text chunks; and
grouping, based on (i) outputs of the semantic search and the keyword search on the plurality of preliminary text chunks and (ii) the associated field of the one or more portions, the plurality of preliminary text chunks into one or more field groups.

3. The computer-implemented system of claim 2, further comprising:
determining whether a first field group of the one or more field groups satisfies a chunk threshold;
responsive to determining that the first field group satisfies the chunk threshold:
merging the preliminary text chunks of the first field group into a first text chunk,
deduplicating, by an overlap detection and deduplication function, redundant portions of the first text chunk,
reordering one or more non-redundant portions of the first text chunk, and
extracting the first text chunk comprising the first field group from the one or more field groups; and
responsive to determining that the first field group fails to satisfy the chunk threshold:
merging at least one chunk from at least a second field group of the one or more field groups with the preliminary text chunks of the first field group into a second text chunk,
deduplicating, by the overlap detection and deduplication function,
redundant portions of the second text chunk,
reordering one or more non-redundant portions of the second text chunk, and
extracting the second text chunk from the one or more field groups.

4. The computer-implemented system of claim 1, wherein applying the structural clustering process further comprises at least one of:
executing a set of regex-based heuristic instructions and a set of rule-based heuristic instructions to detect at least one of: (i) a common clause structure, (ii) a keyword, or (iii) a formatting pattern associated with the file and at least one file represented in the set of structural clusters;

executing a spectral clustering pattern recognition process configured to identify at least one cluster within the set of structural clusters associated with the file based on one or more file structural components of the file; or executing an affinity propagation pattern recognition process configured to cluster the file into the set of structural clusters based on one or more formatting features of the file.

5. The computer-implemented system of claim 1, wherein clustering the file into the first cluster based on the similarity between the semantic cluster and the structural cluster further comprises:

determining, by a projection function, (i) a two-dimensional (2D) projection of at least the semantic cluster and the structural cluster, and (ii) a cross-tabulation heatmap indicating the similarity between at least the semantic cluster and the structural cluster;

generating, by a visualization function, a feature visualization indicating the cross-tabulation heatmap corresponding to at least the semantic cluster and the structural cluster; and causing the feature visualization to be displayed on a user interface for viewing by a user.

6. The computer-implemented system of claim 1, wherein each cluster in the set of structural clusters corresponds to at least one unique feature of the set of features comprising: (i) a table density and complexity value, (ii) an indicator presence value, (iii) an exhibit or attachment format, or (iv) a line length and formatting consistency value.

7. The computer-implemented system of claim 1, wherein the semantic clustering function comprises a k-means clustering function, and wherein the structural clustering process comprises a hierarchical density-based spatial clustering of applications with noise (DBSCAN) process.

8. The computer-implemented system of claim 1, wherein first cluster corresponds to a set of domain-specific terminology, and wherein the computer-executable instructions, when executed by the one or more processors, further cause the computer-implemented system to perform operations comprising:

determining a file class associated with the file based on the extracted textual data;

generating, by a prompt optimization function, a prompt based on the extracted textual data from the file, the first cluster, and the file class associated with the file; and generating, by the language model, the output corresponding to the file based on the prompt.

9. The computer-implemented system of claim 8, wherein generating the prompt further comprises:

training, by the prompt optimization function, the language model using at least one of: (i) a few-shot learning technique or (ii) a multi-shot learning technique; and updating, by the prompt optimization function, the prompt based on outputs of the language model associated with the training.

10. The computer-implemented system of claim 1, wherein the computer-executable instructions, when executed by the one or more processors, further cause the computer-implemented system to perform operations comprising:

identifying, by a real-time tracking and self-repair function, a failed process or an incomplete process during any of the extracting, the converting, the decomposing, the clustering, or the generating;

determining, by the real-time tracking and self-repair function, whether the failed process or the incomplete process is associated with a current process or a prior process; and adjusting, by the real-time tracking and self-repair function, a parameter of the current process or the prior process based on the determining.

11. The computer-implemented system of claim 1, wherein extracting the metadata from the file further comprises:

extracting, by the extraction function, the metadata into the hierarchical format that indicates at least one field corresponding to the file, the at least one field being associated with a plurality of nested data indicating a structure of the extracted textual data corresponding to the at least one field; and storing the extracted metadata in a storage location in the hierarchical format.

12. A non-transitory computer-readable medium storing instructions thereon that, when executed by one or more processors, cause the one or more processors to:

extract, using an extraction function, (i) textual data from a file and (ii) metadata from the file in a hierarchical format configured to preserve hierarchical data structures of the file including at least a first one-to-many relationship indicated in the textual data;

convert, by an embedding function, the extracted textual data into at least one embedding corresponding to the file;

decompose, using a smart chunking function based on the extracted metadata, the extracted textual data into a set of text chunks at least partially by performing (i) a semantic search and (ii) a keyword search on the extracted textual data;

cluster the file into a first cluster of a set of clusters by:

executing a semantic clustering function to cluster the at least one embedding into a semantic cluster of a set of semantic clusters, executing a structural clustering process to cluster the set of text chunks into a structural cluster of a set of structural clusters, and clustering the file into the first cluster based on a similarity between the semantic cluster and the structural cluster;

generate, by a language model and based on the first cluster, an output corresponding to the file; and cause the output to be displayed for viewing by a user.

13. The non-transitory computer-readable medium of claim 12, wherein decomposing the extracted textual data into the set of text chunks using the smart chunking function further comprises:

determining (i) contextual similarity between one or more portions of the extracted textual data, (ii) a set of chunk size and overlap parameters associated with the one or more portions based on the contextual similarity, and (iii) a plurality of preliminary text chunks corresponding to the set of chunk size and overlap parameters, wherein at least a first preliminary text chunk of the plurality of preliminary text chunks has an overlap portion associated with another respective preliminary text chunk of the plurality of preliminary text chunks, and wherein the one or more portions of the extracted textual data have an associated field indicated by the extracted metadata;

applying a set of sequential identifiers to the plurality of
preliminary text chunks; and grouping, based on (i) outputs of the semantic search and
the keyword search on the plurality of preliminary text
chunks and (ii) the associated field of the one or more
portions, the plurality of preliminary text chunks into
one or more field groups.

14. The non-transitory computer-readable medium of
claim 13, wherein the instructions, when executed by the
one or more processors, further cause the one or more
processors to perform operations comprising:

determining whether a first field group of the one or more
field groups satisfies a chunk threshold;

responsive to determining that the first field group satis-
fies the chunk threshold:

merging the preliminary text chunks of the first field
group into a first text chunk, deduplicating, by an overlap detection and deduplica-
tion function, redundant portions of the first text
chunk, reordering one or more non-redundant portions of the
first text chunk, and extracting the first text chunk comprising the first field
group from the one or more field groups; and responsive to determining that the first field group fails to
satisfy the chunk threshold:

merging at least one chunk from at least a second field
group of the one or more field groups with the
preliminary text chunks of the first field group into a
second text chunk, deduplicating, by the overlap detection and deduplica-
tion function, redundant portions of the second text
chunk, reordering one or more non-redundant portions of the
second text chunk, and extracting the second text chunk from the one or more
field groups.

15. The non-transitory computer-readable medium of
claim 12, wherein applying the structural clustering process
further comprises at least one of:

executing a set of regex-based heuristic instructions and a
set of rule-based heuristic instructions to detect at least
one of: (i) a common clause structure, (ii) a keyword,
or (iii) a formatting pattern associated with the file and
at least one file represented in the set of structural
clusters;

executing a spectral clustering pattern recognition process
configured to identify at least one cluster within the set
of structural clusters associated with the file based on
one or more file structural components of the file; or executing an affinity propagation pattern recognition pro-
cess configured to cluster the file into the set of struc-
tural clusters based on one or more formatting features
of the file.

16. The non-transitory computer-readable medium of
claim 12, wherein clustering the file into the first cluster
based on the similarity between the semantic cluster and the
structural cluster further comprises:

determining, by a projection function, (i) a two-dimen-
sional (2D) projection of at least the semantic cluster
and the structural cluster, and (ii) a cross-tabulation
heatmap indicating the similarity between at least the
semantic cluster and the structural cluster;

generating, by a visualization function, a feature visual-
ization indicating the cross-tabulation heatmap corre-
sponding to at least the semantic cluster and the struc-
tural cluster; and causing the feature visualization to be displayed on a user
interface for viewing by a user.

17. The non-transitory computer-readable medium of
claim 12, wherein each cluster in the set of structural clusters
corresponds to at least one unique feature of the set of
features comprising: (i) a table density and complexity
value, (ii) an indicator presence value, (iii) an exhibit or
attachment format, or (iv) a line length and formatting
consistency value.

18. The non-transitory computer-readable medium of
claim 12, wherein first cluster corresponds to a set of
domain-specific terminology, and wherein the instructions,
when executed by the one or more processors, further cause
the one or more processors to perform operations compris-
ing:

determining a file class associated with the file based on
the extracted textual data;

generating, by a prompt optimization function, a prompt
based on the extracted textual data from the file, the
first cluster, and the file class associated with the file at
least by:

training, by the prompt optimization function, the lan-
guage model using at least one of: (i) a few-shot
learning technique or (ii) a multi-shot learning tech-
nique, and updating, by the prompt optimization function, the
prompt based on outputs of the language model
associated with the training; and generating, by the language model, the output correspond-
ing to the file based on the prompt.

19. The non-transitory computer-readable medium of
claim 12, wherein the instructions, when executed by the
one or more processors, further cause the one or more
processors to perform operations comprising:

identifying, by a real-time tracking and self-repair func-
tion, a failed process or an incomplete process during
any of the extracting, the converting, the decomposing,
the clustering, or the generating;

determining, by the real-time tracking and self-repair
function, whether the failed process or the incomplete
process is associated with a current process or a prior
process; and adjusting, by the real-time tracking and self-repair func-
tion, a parameter of the current process or the prior
process based on the determining.

20. A computer-implemented method for improved file
processing, the computer-implemented method comprising:

extracting, by one or more processors and using an
extraction function, (i) textual data from a file and (ii)
metadata from the file in a hierarchical format config-
ured to preserve hierarchical data structures of the file
including at least a first one-to-many relationship indi-
cated in the textual data;

converting, by the one or more processors using an
embedding function, the extracted textual data into at
least one embedding corresponding to the file;

decomposing, by the one or more processors using a smart
chunking function based on the extracted metadata, the
extracted textual data into a set of text chunks at least
partially by performing (i) a semantic search and (ii) a
keyword search on the extracted textual data;

clustering, by the one or more processors, the file into a
first cluster of a set of clusters by:

executing a semantic clustering function to cluster the
at least one embedding into a semantic cluster of a
set of semantic clusters, executing a structural clustering process to cluster the set of text chunks into a structural cluster of a set of structural clusters, and clustering the file into the first cluster based on a similarity between the semantic cluster and the structural cluster;

generating, by the one or more processors using a language model and based on the first cluster, an output corresponding to the file; and causing, by the one or more processors, the output to be displayed for viewing by a user.

\* \* \* \* \*